US012652543B2

(12) United States Patent
Faccin et al.

(10) Patent No.: US 12,652,543 B2
(45) Date of Patent: Jun. 9, 2026

(54) GATEWAY SELECTION FOR PRIVATE WIRELESS NETWORKS

(71) Applicant: QUALCOMM INCORPORATED, San Diego, CA (US)

(72) Inventors: Stefano Faccin, San Ysidro, CA (US); Haris Zisimopoulos, London (GB); Sebastian Speicher, Wallisellen (CH)

(73) Assignee: QUALCOMM Incorporated, San Diego, CA (US)

( * ) Notice: Subject to any disclaimer, the term of this patent is extended or adjusted under 35 U.S.C. 154(b) by 484 days.

(21) Appl. No.: 17/915,464

(22) PCT Filed: May 11, 2021

(86) PCT No.: PCT/US2021/031719
§ 371 (c)(1),
(2) Date: Sep. 28, 2022

(87) PCT Pub. No.: WO2021/231387
PCT Pub. Date: Nov. 18, 2021

(65) Prior Publication Data
US 2023/0131915 A1     Apr. 27, 2023

(30) Foreign Application Priority Data

May 13, 2020   (GR) .............................. 20200100252

(51) Int. Cl.
*H04W 12/80*     (2021.01)
*H04L 61/4511*   (2022.01)
*H04W 48/18*     (2009.01)
*H04L 101/69*    (2022.01)
*H04W 84/04*     (2009.01)

(52) U.S. Cl.
CPC ......... *H04W 12/80* (2021.01); *H04L 61/4511* (2022.05); *H04W 48/18* (2013.01); *H04L 2101/69* (2022.05); *H04W 84/042* (2013.01)

(58) Field of Classification Search
CPC ... H04W 12/80; H04W 48/18; H04W 84/042; H04W 48/14; H04W 4/02; H04W 84/04;
(Continued)

(56) References Cited

U.S. PATENT DOCUMENTS

| 2019/0313234 A1* | 10/2019 | Liu ........................ H04W 48/20 |
| 2020/0314701 A1* | 10/2020 | Talebi Fard .......... H04W 36/08 |

(Continued)

FOREIGN PATENT DOCUMENTS

| WO | WO-2019097499 A1 | 5/2019 |
| WO | WO-2020092173 A1 | 5/2020 |

OTHER PUBLICATIONS

3GPP: "3rd Generation Partnership Project, Technical Specification Group Core Network and Terminals, Access to the 3GPP 5G Core Network (5GCN) via Non-3GPP Access Networks (N3AN), Stage 3 (Release 16)", 3GPP Standard, Technical Specification, 3GPP TS 24.502, 3rd Generation Partnership Project (3GPP), Mobile Competence Centre, 650, Route Des Lucioles, F-06921 Sophia-Antipolis Cedex, France, vol. CT WG1, No. V16.3.0, Mar. 27, 2020, 84 Pages, XP051861108, Section 7.2.

(Continued)

*Primary Examiner* — Marcus Hammonds
(74) *Attorney, Agent, or Firm* — Holland & Hart LLP

(57) ABSTRACT

Methods, systems, and devices for wireless communications are described. A user equipment (UE) may determine whether a geographic location code associated with a geographic location of the UE matches a geographic location code in a received message. Based on the determination, the UE may select a non-public network (NPN) function. Additionally or alternatively, a UE may discover or select an NPN function based on determining that legal requirements, such as one or more interception conditions, are independent of the geographic location of the UE. For example, the UE (Continued)

may discover and one or more NPN functions according to a query performed using an NPN function identifier or an NPN identifier. The UE may determine that the NPN function selection (e.g., for a geographic location of the UE) is independent of an interception condition (e.g., associated with the geographic location of the UE).

30 Claims, 14 Drawing Sheets

(58) Field of Classification Search
CPC ............. H04L 61/4511; H04L 2101/69; H04L 61/3025; H04L 41/12; H04L 12/4633
See application file for complete search history.

(56) References Cited

U.S. PATENT DOCUMENTS

| | | | | |
|---|---|---|---|---|
| 2021/0168881 A1* | 6/2021 | Kedalagudde | ........ | H04W 76/10 |
| 2021/0345226 A1* | 11/2021 | Liao | ..................... | H04W 48/18 |
| 2022/0038898 A1* | 2/2022 | Stojanovski | .......... | H04W 60/04 |

OTHER PUBLICATIONS

3GPP: "3rd Generation Partnership Project, Technical Specification Group Core Network and Terminals, Numbering, Addressing and Identification, (Release 16)", 3GPP Standard, Technical Specification, 3GPP TS 23.003, 3rd Generation Partnership Project (3GPP), Mobile Competence Centre, 650, Route Des Lucioles, F-06921 Sophia-Antipolis Cedex, France, vol. CT WG4, No. V16.2.0, Mar. 30, 2020, (Mar. 30, 2020), 140 Pages, XP051861211, Section 28.3.
Blackberry UK Ltd: "Correct N3AN Node Selection Due to LI", 3GPP TSG-CT WG1 Meeting #123-e, 3GPP Draft, C1-202832, 3rd Generation Partnership Project (3GPP), Mobile Competence Centre, 650, Route Des Lucioles, F-06921 Sophia-Antipolis Cedex, France, vol. CT WG1, No. Online Meeting, Apr. 16, 2020-Apr. 24, 2020, Apr. 23, 2020 (Apr. 23, 2020), 13 Pages, XP051878057, pp. 3-9.
International Search Report and Written Opinion—PCT/US2021/031719—ISA/EPO—Jul. 30, 2021 (204037WO).

* cited by examiner

910

915

905

900

Receive a message including one or more geographic location codes 〜1105

Determine whether a geographic location code associated with a geographic location of the UE matches at least one geographic location code in the received message 〜1110

Select an NPN function based on the determining 〜1115

1100

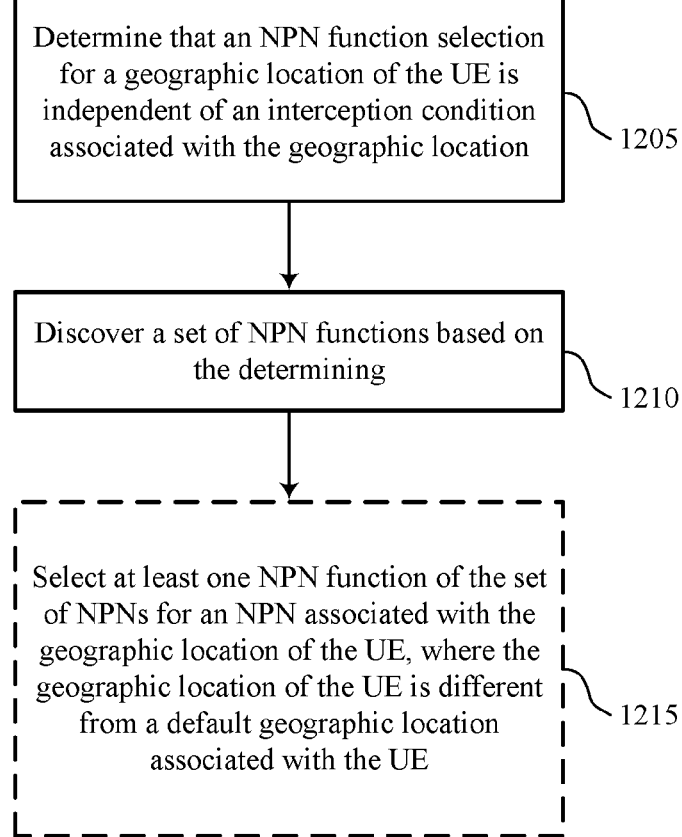

Determine that an NPN function selection for a geographic location of the UE is independent of an interception condition associated with the geographic location

1205

Discover a set of NPN functions based on the determining

1210

Select at least one NPN function of the set of NPNs for an NPN associated with the geographic location of the UE, where the geographic location of the UE is different from a default geographic location associated with the UE

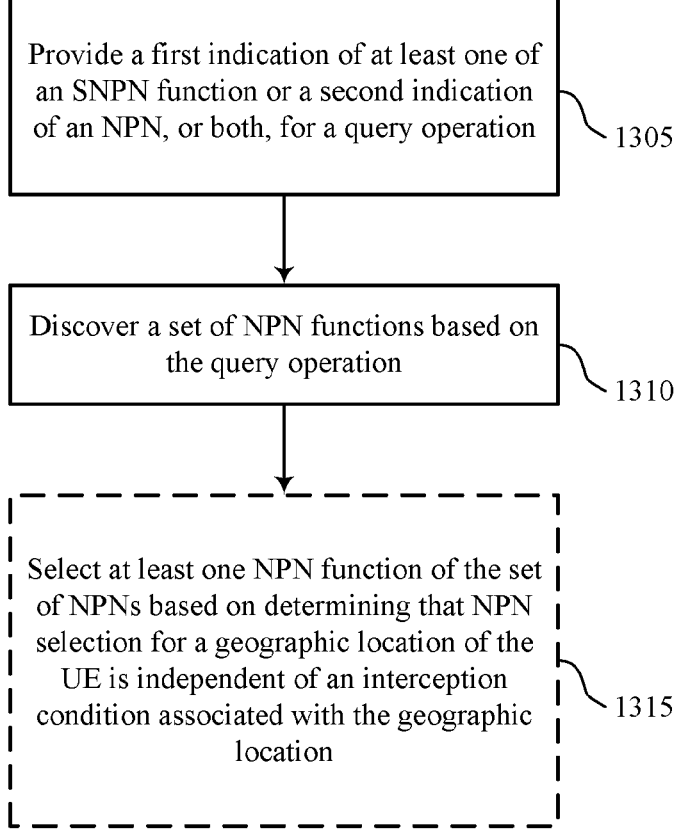

Provide a first indication of at least one of an SNPN function or a second indication of an NPN, or both, for a query operation

1305

Discover a set of NPN functions based on the query operation

1310

Select at least one NPN function of the set of NPNs based on determining that NPN selection for a geographic location of the UE is independent of an interception condition associated with the geographic location

Receive a first indication of an SNPN or a
second indication of an NPN, or both

1405

Determine a set of NPN functions based
on a query operation

1410

Provide the set of NPN functions

1415

1400

GATEWAY SELECTION FOR PRIVATE WIRELESS NETWORKS

CROSS REFERENCE

The present Application is a 371 national stage filing of International PCT Application No. PCT/US2021/031719 by FACCIN et al. entitled "GATEWAY SELECTION FOR PRIVATE WIRELESS NETWORKS," filed May 11, 2021; and claims priority to International Patent Application No. 20200100252 by FACCIN et al. entitled "GATEWAY SELECTION FOR PRIVATE WIRELESS NETWORKS," filed May 13, 2020, each of which is assigned to the assignee hereof, and each of which is expressly incorporated by reference in its entirety herein

INTRODUCTION

The following relates to wireless communications, and more specifically to managing wireless communications over private wireless networks.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM).

A wireless multiple-access communications system may include one or more base stations or one or more network access nodes, each simultaneously supporting communication for multiple communication devices, which may be otherwise known as user equipment (UE). Some communications devices may belong to a public land mobile network (PLMN), which may be a home public land mobile network (HPLMN) or a visited public land mobile network (VPLMN). A PLMN may be a geographic region (e.g., a country) covered by a mobile operator to provide various wireless communication services (e.g., voice and data services) to the communications devices.

SUMMARY

A method of wireless communications at a UE is described. The method may include receiving a message including one or more geographic location codes, determining whether a geographic location code associated with a geographic location of the UE matches at least one geographic location code in the received message, and selecting a non-public network (NPN) function based on the determining.

An apparatus for wireless communications is described. The apparatus may include a processor, memory coupled with the processor, the processor and memory configured to receive a message including one or more geographic location codes, determine whether a geographic location code associated with a geographic location of the apparatus matches at least one geographic location code in the received message, and select an NPN function based on the determining.

Another apparatus for wireless communications is described. The apparatus may include means for receiving a message including one or more geographic location codes, determining whether a geographic location code associated with a geographic location of the apparatus matches at least one geographic location code in the received message, and selecting an NPN function based on the determining.

A computer-readable medium storing code for wireless communications at a UE is described. The code may include instructions executable by a processor to receive a message including one or more geographic location codes, determine whether a geographic location code associated with a geographic location of the UE matches at least one geographic location code in the received message, and select an NPN function based on the determining.

In some examples of the method, apparatuses, and computer-readable medium described herein, the message includes NPN function identifiers.

In some examples of the method, apparatuses, and computer-readable medium described herein, receiving the message may include operations, features, means, or instructions for receiving a list including a set of tuples including the one or more geographic location codes or the NPN function identifiers, or both.

In some examples of the method, apparatuses, and computer-readable medium described herein, determining whether the geographic location code associated with the geographic location of the UE matches at least one geographic location code associated with the one or more geographic location codes in the received message may include operations, features, means, or instructions for determining that the geographic location code associated with the geographic location of the UE matches at least one geographic location code associated with the one or more geographic location codes in the received message, wherein selecting the NPN function includes selecting, based on a selection procedure, the NPN function using an NPN function identifier.

In some examples of the method, apparatuses, and computer-readable medium described herein, determining whether the geographic location code associated with the geographic location of the UE matches at least one geographic location code associated with the one or more geographic location codes in the received message may include operations, features, means, or instructions for determining that a geographic location code of a serving PLMN matches at least one geographic location code associated with the one or more geographic location codes in the received message.

Some examples of the method, apparatuses, and computer-readable medium described herein may further include operations, features, means, or instructions for terminating the selection procedure based on selecting the NPN function using the NPN function identifier.

Some examples of the method, apparatuses, and computer-readable medium described herein may further include operations, features, means, or instructions for refraining from determining whether selection of the NPN function may be configured for the geographic location of the UE based on terminating the selection procedure.

In some examples of the method, apparatuses, and computer-readable medium described herein, determining whether the geographic location code associated with the geographic location of the UE matches at least one geographic location code associated with the one or more geographic location codes in the received message may include operations, features, means, or instructions for determining that the geographic location code associated with the geographic location of the UE does not match at least one geographic location code associated with the one or more geographic location codes in the received message, wherein selecting the NPN function includes: performing a selection procedure to select the NPN function based on determining that the geographic location code associated with the geographic location of the UE does not match at least one geographic location code associated with the one or more geographic location codes in the received message.

In some examples of the method, apparatuses, and computer-readable medium described herein, performing the selection procedure may include operations, features, means, or instructions for determining whether selection of the NPN function may be configured for the geographic location of the UE, wherein selecting the NPN function includes selecting the NPN function using a default NPN function identifier based on determining that selection of the NPN function is not needed for the geographic location of the UE.

In some examples of the method, apparatuses, and computer-readable medium described herein, receiving the message may include operations, features, means, or instructions for receiving a default NPN function identifier.

In some examples of the method, apparatuses, and computer-readable medium described herein, the geographic location codes correspond to NPN functions in a default geographic location associated with the UE.

In some examples of the method, apparatuses, and computer-readable medium described herein, selecting the NPN function may include operations, features, means, or instructions for selecting the NPN function using a default NPN function identifier and based on determining that the geographic location code associated with the geographic location of the UE does not match at least one geographic location code associated with the one or more geographic location codes in the received message.

In some examples of the method, apparatuses, and computer-readable medium described herein, the one or more geographic location codes include mobile country codes (MCC).

In some examples of the method, apparatuses, and computer-readable medium described herein, the NPN function includes an NPN non-third generation partnership project interworking function (N3IWF).

In some examples of the method, apparatuses, and computer-readable medium described herein, the NPN function identifier includes an NPN N3IWF identifier.

In some examples of the method, apparatuses, and computer-readable medium described herein, the NPN N3IWF identifier may be a fully-qualified domain name (FQDN).

In some examples of the method, apparatuses, and computer-readable medium described herein, the NPN N3IWF identifier may be an internet protocol (IP) address.

A method of wireless communications at a UE is described. The method may include determining that an NPN function selection for a geographic location of the UE is independent of an interception condition associated with the geographic location, discovering a set of NPN functions based on the determining, and selecting at least one NPN function of the set of NPN functions for an NPN associated with the geographic location of the UE, wherein the geographic location of the UE is different from a default geographic location associated with the UE.

An apparatus for wireless communications is described. The apparatus may include a processor, memory coupled with the processor, the processor and memory configured to determine that an NPN function selection for a geographic location of the apparatus is independent of an interception condition associated with the geographic location, discover a set of NPN functions based on the determining, and select at least one NPN function of the set of NPN functions for an NPN associated with the geographic location of the UE, wherein the geographic location of the UE is different from a default geographic location associated with the UE.

Another apparatus for wireless communications is described. The apparatus may include means for determining that an NPN function selection for a geographic location of the apparatus is independent of an interception condition associated with the geographic location, discovering a set of NPN functions based on the determining, and selecting at least one NPN function of the set of NPN functions for an NPN associated with the geographic location of the UE, wherein the geographic location of the UE is different from a default geographic location associated with the UE.

A computer-readable medium storing code for wireless communications at a UE is described. The code may include instructions executable by a processor to determine that an NPN function selection for a geographic location of the UE is independent of an interception condition associated with the geographic location, discover a set of NPN functions based on the determining, and select at least one NPN function of the set of NPN functions for an NPN associated with the geographic location of the UE, wherein the geographic location of the UE is different from a default geographic location associated with the UE.

Some examples of the method, apparatuses, and computer-readable medium described herein may further include operations, features, means, or instructions for receiving a message including an indication that the NPN function selection for the geographic location of the UE may be independent of the interception condition associated with the geographic location, wherein selecting the at least one NPN function of the set of NPN functions for the NPN associated with the geographic location of the UE may be based on the received message including the indication.

Some examples of the method, apparatuses, and computer-readable medium described herein may further include operations, features, means, or instructions for determining a domain name associated with the geographic location of the UE, wherein a query operation may be performed using the domain name associated with the geographic location of the UE, and discovering the set of NPN functions may be based on the performed query operation.

In some examples of the method, apparatuses, and computer-readable medium described herein, the query operation includes a domain name system (DNS) naming authority pointer (NAPTR) query operation.

Some examples of the method, apparatuses, and computer-readable medium described herein may further include operations, features, means, or instructions for receiving a set of records related to the domain name associated with the geographic location of the UE based on the performed query operation, wherein selecting the at least one NPN function of the set of NPN functions for the NPN associated with the geographic location of the UE may be based on at least one record of the set records.

In some examples of the method, apparatuses, and computer-readable medium described herein, the set of records includes a set of network identifiers associated with a set of PLMNs.

In some examples of the method, apparatuses, and computer-readable medium described herein, the set of records includes an indication that the NPN function selection for the geographic location of the UE may be independent of the interception condition associated with the geographic location.

In some examples of the method, apparatuses, and computer-readable medium described herein, the set of records includes a list of standalone NPNs (SNPNs) and selecting the at least one NPN function of the set of NPN functions for the NPN associated with the geographic location of the UE may be based on the list of SNPNs.

In some examples of the method, apparatuses, and computer-readable medium described herein, the set records include a set of NAPTR records.

In some examples of the method, apparatuses, and computer-readable medium described herein, the domain name includes an FQDN.

Some examples of the method, apparatuses, and computer-readable medium described herein may further include operations, features, means, or instructions for receiving a message including a list of NPNs that may be independent of the interception condition associated with the geographic location, wherein selecting the at least one NPN function of the set of NPN functions for the NPN associated with the geographic location of the UE may be based on the list of NPNs that may be independent of the interception condition.

In some examples of the method, apparatuses, and computer-readable medium described herein, the interception condition includes a local legal interception condition associated with the geographic location of the UE.

A method of wireless communications at a UE is described. The method may include providing a first indication of at least one of an SNPN function or a second indication of an NPN, or both, for a query operation, discovering a set of NPN functions based on the query operation, and selecting at least one NPN function of the set of NPN functions based on determining that NPN function selection for a geographic location of the UE is independent of an interception condition associated with the geographic location.

An apparatus for wireless communications at a UE is described. The apparatus may include a processor, memory coupled with the processor, the processor and memory configured to provide a first indication of at least one of an SNPN function or a second indication of an NPN, or both, for a query operation, discover a set of NPN functions based on the query operation, and select at least one NPN function of the set of NPN functions based on determining that NPN function selection for a geographic location of the UE is independent of an interception condition associated with the geographic location.

Another apparatus for wireless communications at a UE is described. The apparatus may include means for providing a first indication of at least one of an SNPN function or a second indication of an NPN, or both, for a query operation, discovering a set of NPN functions based on the query operation, and selecting at least one NPN function of the set of NPN functions based on determining that NPN function selection for a geographic location of the UE is independent of an interception condition associated with the geographic location.

A computer-readable medium storing code for wireless communications at a UE is described. The code may include instructions executable by a processor to provide a first indication of at least one of an SNPN function or a second indication of an NPN, or both, for a query operation, discover a set of NPN functions based on the query operation, and select at least one NPN function of the set of NPN functions based on determining that NPN function selection for a geographic location of the UE is independent of an interception condition associated with the geographic location.

In some examples of the method, apparatuses, and computer-readable medium described herein, the query operation may be performed using a domain name of the geographic location of the UE, wherein the geographic location of the UE may be different from a default geographic location associated with the UE.

Some examples of the method, apparatuses, and computer-readable medium described herein may further include operations, features, means, or instructions for generating the domain name using a set of labels, wherein the domain name includes an FQDN.

In some examples of the method, apparatuses, and computer-readable medium described herein, a first label of the set of labels includes an NPN function identifier.

In some examples of the method, apparatuses, and computer-readable medium described herein, a first label of the set of labels includes a PLMN identifier and a network identifier associated with an SNPN.

In some examples of the method, apparatuses, and computer-readable medium described herein, a second label of the set of labels includes an SNPN identifier.

In some examples of the method, apparatuses, and computer-readable medium described herein, a third label of the set of labels includes a geographic location code identifying the geographic location in which the UE may be located.

In some examples of the method, apparatuses, and computer-readable medium described herein, the geographic location code includes an MCC.

In some examples of the method, apparatuses, and computer-readable medium described herein, a fourth label of the set of labels includes a geographic location code identifying a visited geographic location of the UE.

In some examples of the method, apparatuses, and computer-readable medium described herein, one or more NAPTR records associated with the domain name of the geographic location include a set of network identifiers associated with a set of PLMNs.

Some examples of the method, apparatuses, and computer-readable medium described herein may further include operations, features, means, or instructions for selecting a packet gateway based on the set of network identifiers associated with the set of PLMNs.

Some examples of the method, apparatuses, and computer-readable medium described herein may further include operations, features, means, or instructions for determining that the NPN function selection for the geographic location of the UE may be independent of the interception condition associated with the geographic location may be based on a query result of the query operation.

In some examples of the method, apparatuses, and computer-readable medium described herein, the query result includes a set of records including a service instance associated with an FQDN including a set of query labels.

In some examples of the method, apparatuses, and computer-readable medium described herein, the query operation includes a DNS NAPTR query operation.

In some examples of the method, apparatuses, and computer-readable medium described herein, the interception condition includes a local legal interception condition associated with the geographic location of the UE.

In some examples of the method, apparatuses, and computer-readable medium described herein, the selecting is based on placing an emergency call.

A method of wireless communications at a base station is described. The method may include receiving a first indication of an SNPN or a second indication of an NPN, or both, determining a set of NPN functions based on a query operation, and providing the set of NPN functions.

An apparatus for wireless communications is described. The apparatus may include a processor, memory coupled with the processor, the processor and memory configured to receive a first indication of an SNPN or a second indication of an NPN, or both, determine a set of NPN functions based on a query operation, and provide the set of NPN functions.

Another apparatus for wireless communications is described. The apparatus may include means for receiving a first indication of an SNPN or a second indication of an NPN, or both, determining a set of NPN functions based on a query operation, and providing the set of NPN functions.

A computer-readable medium storing code for wireless communications at a base station is described. The code may include instructions executable by a processor to receive a first indication of an SNPN or a second indication of an NPN, or both, determine a set of NPN functions based on a query operation, and provide the set of NPN functions.

In some examples of the method, apparatuses, and computer-readable medium described herein, the set of NPN functions includes an NPN N3IWF.

In some examples of the method, apparatuses, and computer-readable medium described herein, the query operation includes a DNS NAPTR query operation.

BRIEF DESCRIPTION OF THE DRAWINGS

FIGS. 11 through 14 show flowcharts illustrating methods in accordance with one or more aspects of the present disclosure.

DETAILED DESCRIPTION

Figure 1:
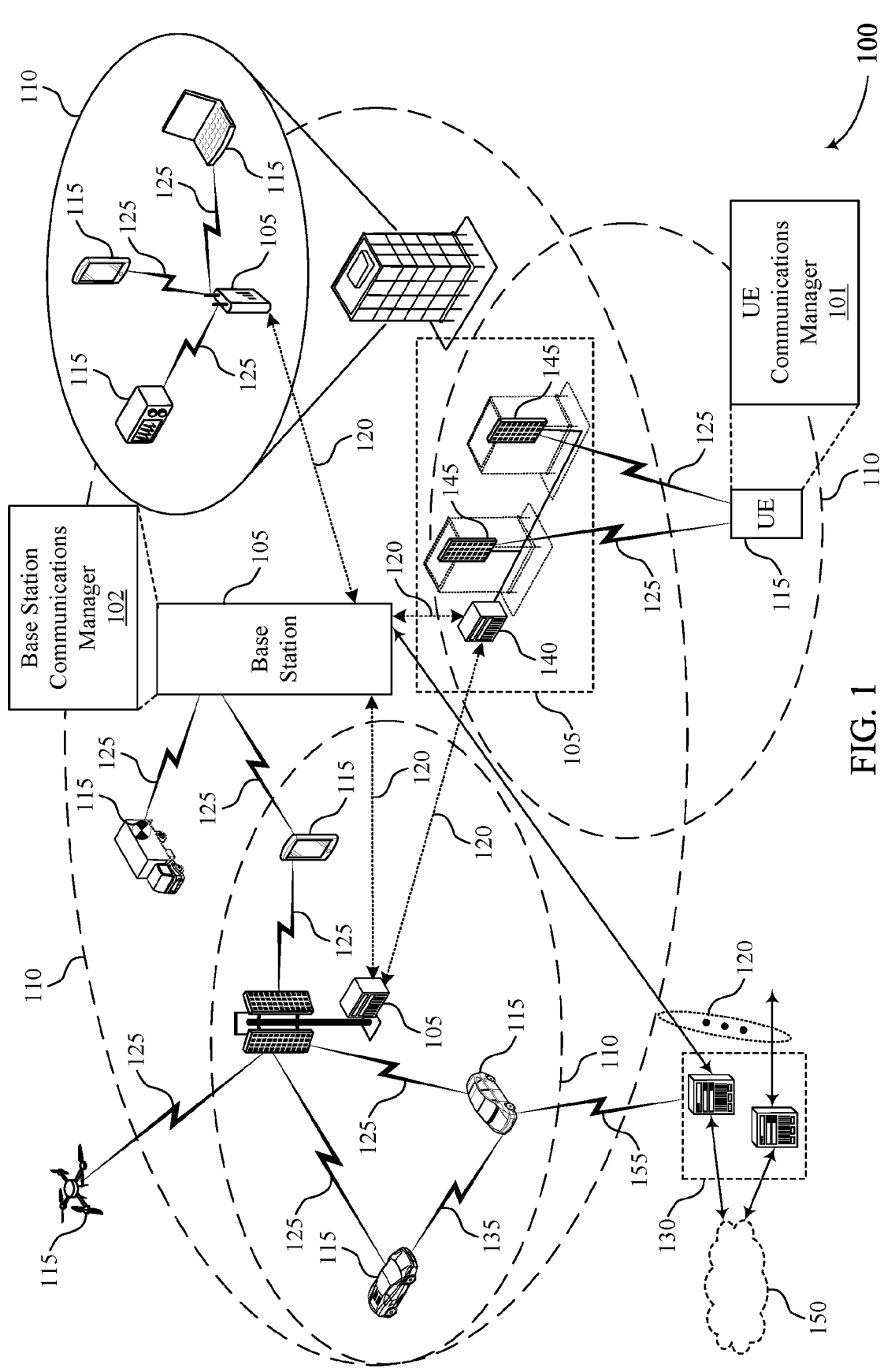
FIGS. 1 and 2 illustrate examples of wireless communications systems in accordance with one or more aspects of the present disclosure.

Some wireless communication systems may include communication devices, such as UEs and base stations, for example, eNodeBs (eNBs), next-generation NodeBs or giga-NodeBs (either of which may be referred to as a gNB) that may support multiple radio access technologies. Examples of radio access technologies include 4G systems such as LTE systems and 5G systems which may be referred to as NR systems. A UE may belong to a public land mobile network (PLMN), which may be a home public land mobile network (HPLMN) or a visited public land mobile network (VPLMN). A PLMN may be a geographic region (e.g., a country) covered by a mobile operator to provide various wireless communication services (e.g., voice and data services) to the UE.

In some examples, each public network may be identified by a mobile country code (MCC). Using various identifiers of the UE, an HPLMN can be identified. In some cases, the UE may roam to different geographic regions (e.g., different countries). The UE may attach to a roaming network, which may be referred to as a visiting network. In one example, while connected to a visiting network, the UE may register with and connect to a standalone non-public network (SNPN) to access SNPN services. For example, a UE connected to a visiting network may want to register with a network of a specific company, which is a non-public network. Registering with a non-public network while connected with a visiting network may, in some examples, be challenging due to various legal requirements. For instance, a country may, in some cases, require that non-public networks be available via the country's PLMN. If a country has this requirement, and a company's network is not available to select via that country's public network, a UE visiting that country would be unable to select and register with the company's non-public network.

In some examples, as demand for communication efficiency increases, the UEs may provide high reliability and low latency wireless communications by assuming that non-public networks establish agreements with countries where legal requirements mandate non-public networks to be available via that country's public network as described herein. A UE may be configured to receive a message that includes a code identifying a country. The UE may determine whether this code matches the code of the country in which the UE is located. If the codes match, the UE uses an identifier of a non-public network to select a non-public network in the UE's home country. Alternatively, when the codes do not match because the UE is located in another country, the UE may use an identifier of the home network as well as an identifier of a non-public network to select a non-public network in the UE's home country. Although various aspects of the present disclosure are described with reference to legal requirements (e.g., local legal interception requirements) for managing wireless communications over private wireless networks, it should be realized that other requirements (e.g., based on services requested by a UE, authorization to the requested services by the UE, available networks offering the services requested by the UE, etc.) and changes for managing wireless communications over private wireless networks can be implemented without departing from the scope of the present disclosure.

Aspects of the subject matter described in this disclosure may be implemented to realize one or more of the following potential improvements, among others. The techniques employed by the UEs may provide benefits and enhancements to the operation of the UEs. In some examples, operations performed by the UEs may provide improvements to wireless communications. In some other examples, configuring the UEs to manage wireless communications over private wireless networks by improving gateway selection for the private wireless networks may support improvements to power consumption, spectral efficiency, and, in some examples, may promote high reliability and low latency wireless communications, among other benefits.

Aspects of the disclosure are initially described in the context of wireless communications systems. Aspects of the disclosure are further illustrated by and described with reference to apparatus diagrams, system diagrams, and flow-charts that relate to managing wireless communications over private wireless networks by improving gateway selection for the private wireless networks.

FIG. 1 illustrates an example of a wireless communications system 100 in accordance with one or more aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, inte-grated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may commu-nicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links. A UE 115 may communicate with the core network 130 through a communication link 155. One or more of the base stations 105 described herein may include or may be referred to by a person having ordinary skill in the art as a base transceiver station, a radio base station, an access point, a radio trans-ceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples. The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communi-cation links 125 over one or more carriers. The term "car-rier" may refer to a set of radio frequency spectrum resources having a defined physical layer structure for supporting the communication links 125. For example, a carrier used for a communication link 125 may include a portion of a radio frequency spectrum band (e.g., a band-width part (BWP)) that is operated according to one or more physical layer channels for a given radio access technology (e.g., LTE, LTE-A, LTE-A Pro, NR). Each physical layer channel may carry acquisition signaling (e.g., synchroniza-tion signals, system information), control signaling that coordinates operation for the carrier, user data, or other signaling. The wireless communications system 100 may support communication with a UE 115 using carrier aggre-gation or multi-carrier operation. A UE 115 may be config-ured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configu-ration), a carrier may also have acquisition signaling or control signaling that coordinates operations for other car-riers. A carrier may be associated with a frequency channel (e.g., an evolved universal mobile telecommunication sys-tem terrestrial radio access (E-UTRA) absolute radio fre-quency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmis-sions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode). A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs. The time intervals for the base stations 105 or the UEs 115 may be expressed in multiples of a basic time unit which may, for example, refer to a sampling period of $T_s = 1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation. A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers. In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof.

For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operator's IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, in the range of 300 megahertz (MHz) to 300 gigahertz (GHz). The region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming.

The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 may include a UE communications manager 101 that may provide high reliability and low latency wireless communications by assuming that non-public networks establish agreements with countries where legal requirements mandate non-public networks to be available via that country's public network as described herein. The UE communications manager 101 may be an example of aspects of a UE communications manager as described in FIGS. 3 through 6. Similarly, the base stations 105 may include a base station communications manager 102 that may provide high reliability and low latency wireless communications by assuming that non-public networks establish agreements with countries where legal requirements mandate non-public networks to be available via that country's public network as described herein. The base station communications manager 102 may be an example of aspects of a base station communications manager as described in FIGS. 7 through 10.

By way of example, the UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

The UEs 115 may belong to a PLMN, which may be a HPLMN or a VPLMN. The PLMN may be a geographic region (e.g., a country) covered by a mobile operator to provide various wireless communication services (e.g., voice and data services) to the UEs 115. Each public network may be identified by an MCC. Using various identifiers of the UEs 115, an HPLMN can be identified. In some cases, the UEs 115 may roam to different geographic regions (e.g., different countries). The UEs 115 may attach to a roaming network, which may be referred to as a visiting network. While connected to a visiting network, the UEs 115 may need to register with and connect to an SNPN to access SNPN services. For example, a UE 115 connected to a visiting network may want to register with a network of a specific company, which is a non-public network. Registering with a non-public network while connected with a visiting network may be challenging due to various legal requirements.

For instance, a country may require that non-public networks be available via the country's PLMN. If a country has this requirement, and a company's network is not available to select via that country's public network, a UE 115 visiting that country would be unable to select and register with the company's non-public network. A UE 115 may be configured to receive a message that includes a code identifying a country. The UE 115 may determine whether this code matches the code of the country in which the UE 115 is located. If the codes match, the UE 115 uses an identifier of a non-public network to select a non-public network in the UE's 115 home country. Alternatively, when the codes do not match because the UE 115 is located in another country, the UE 115 will use an identifier of the home network as well as an identifier of a non-public network to select a non-public network in the UE's 115 home country.

Figure 2:
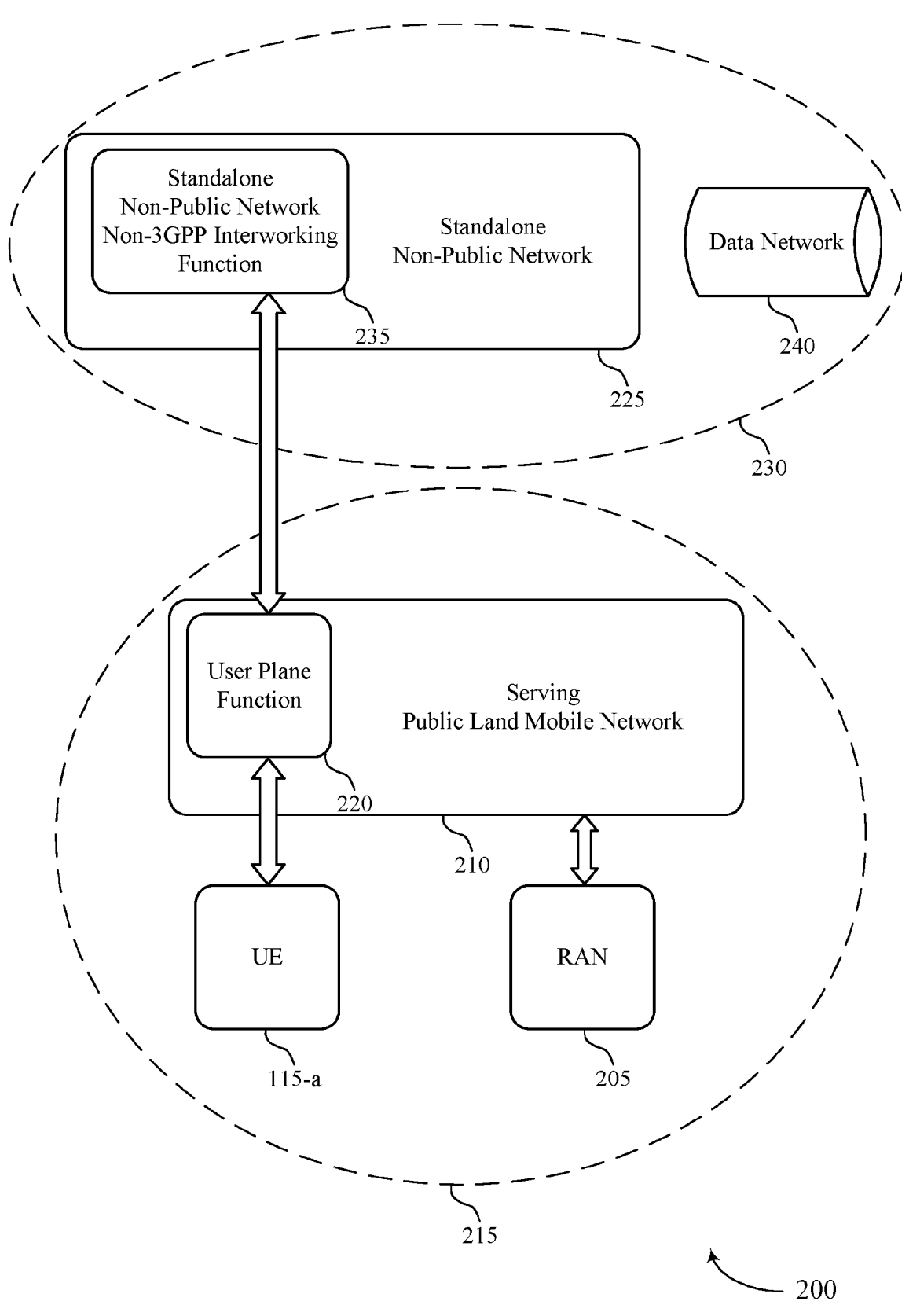

FIG. 2 illustrates an example of a wireless communications system 200 in accordance with one or more aspects of the present disclosure. The wireless communications system 200 may support multiple radio access technologies including 4G systems such as LTE systems, LTE-A systems, or LTE-A Pro systems, and 5G systems, which may be referred to as NR systems. The wireless communications system 200 may implement aspects of the wireless communications system 100. For example, the wireless communications system 200 may include a UE 115-*a*, which may be examples of a UE 115 as described herein. The UE 115-*a* may be an SNPN enabled UE. The wireless communications system 200 may also include a radio access network (RAN) 205, a serving PLMN 210 associated with a geographic location 215, a user plane function (UPF) 220, an SNPN 225 associated with a geographic location 230, an SNPN N3IWF 235, and a data network 240.

The wireless communications system 200 may, in some examples, be an NPN, which may be a 5G system (5GS) deployed for non-public wireless communications. The NPN may be, for example, the SNPN 225, which may be operated by an NPN operator and might not rely on network functions by a PLMN. A network function may be a logical node within a network infrastructure (e.g., such as the wireless communications system 200) with various functions relating to, for example, subscriber sessions (e.g. session establishment, modify and release), security and access management and authorization, and the like. A non-public network function may be a logical node not provided by a PLMN and that is deployed for non-public use in a non-public network. A public network function may be a logical node provided by a PLMN and that is deployed for public use in a public network. Alternatively, the NPN may be a public network integrated NPN (PNI-NPN), which may be an NPN deployed with support of a PLMN. An SNPN and a PLMN may share a RAN, such as the RAN 205. The UE 115-*a* may use a PLMN identifier (ID) or a network identifier (NID), or both, to identify an SNPN, for example the SNPN 225. In some examples, an PLMN ID might not be unique for an SNPN.

The RAN 205 (e.g., a next generation RAN (NG-RAN)) may provide access to an SNPN, such as the SNPN 225, by broadcasting various system information to the UE 115-*a*. In some examples, the RAN 205 may broadcast one or multiple PLMN IDs. In some other examples, the RAN 205 may broadcast a list of network identifications (NIDs) per PLMN ID identifying NPNs that the RAN 205 provides access to. In other examples, the RAN 205 may broadcast a hostname (e.g., a human-readable network name) per NID. The UE 115-*a* may also provide information, such as resource requirements for a service, a priority of the service, among other information to the RAN 205, which the RAN 205 may use to select a data network, such as the data network 240 to provide the service.

An SNPN-enabled UE, such as the UE 115-*a*, may be configured with a subscriber permanent identifier (SUPI) and credentials for each subscribed SNPN identified by the PLMN ID or the NID, or both. The UE 115-*a* may identify a subscriber of an SNPN, such as the SNPN 225, based at least in part on a SUPI including a network-specific identifier that corresponds to a network access identifier (NAI) using an NAI RFC-based user identification technique (e.g., an NAI RFC 7542). A domain part of the NAI may include an NID of the SNPN. Alternatively, the UE 115-*a* may identify the subscriber of the SNPN based at least in part on a SUPI including an international mobile subscriber identity (IMSI). An IMSI may be a unique identifier allocated to the UE 115-*a* and may include an MCC, a mobile network code (MNC), and a mobile subscriber identification number (MSIN). An SNPN-enabled UE, such as the UE 115-*a*, may thereby support an SNPN access mode. When the UE 115-*a* is configured to operate in the SNPN access mode, the UE 115-*a* may exclusively select and register with SNPNs, for example, the SNPN 225 over a universal mobile telecommunications system (UMTS) air interface (e.g., Uu interface).

The UE 115-*a* may identify available PLMN IDs and list of available NIDs from the broadcasted system information and select a PLMN based at least in part on the identified available PLMN IDs and list of available NIDs from the broadcasted system information. In some examples, for automatic network selection, the UE 115-*a* may select and attempt to register with an available SNPN, such as the SNPN 225, identified by a PLMN ID and NID for which the UE 115-*a* has a SUPI and credentials. If multiple SNPNs are available that the UE 115-*a* has respective SUPI and credentials for, then the UE 115-*a* may select an SNPN based at least in part on UE capability or UE configuration. Alternatively, for manual network selection, the UE 115-*a* may provide a list of SNPNs, where each SNPN is identified by a PLMN ID and NID, as well as a hostname (e.g., a related human-readable names, if available) of the available SNPNs the UE 115-*a* has respective SUPI and credentials for. When the UE 115-*a* performs a registration procedure, for example, an initial registration to an SNPN, such as the SNPN 225, the UE 115-*a* may indicate the selected NID and the corresponding PLMN ID to the RAN 205 (e.g., NG-RAN). The RAN 205 may inform an access management function (AMF) of the selected PLMN ID and NID.

To access PLMN services, the UE 115-*a* may perform another registration via an SNPN user plane with a PLMN using the credentials of that PLMN with the SNPN (e.g., the SNPN 225) taking the role of an untrusted non-3GPP access. The UE 115-*a* may perform the other registration, for example, when operating in an SNPN access mode and based at least in part on the UE 115-*a* successfully registering with the SNPN (e.g., the SNPN 225). Alternatively, to access SNPN services, the UE 115-*a*, based at least in part on successfully registering with a PLMN over 3GPP access, may perform another registration via the PLMN user plane with an SNPN using the credentials of the SNPN with the PLMN taking the role of untrusted non-3GPP access of the SNPN (i.e. using procedures for untrusted non-3GPP access). The UPF 220 may include user plane function functionality. For example, the UPF 220 may additionally or alternatively support packet routing and forwarding, packet inspection, a quality-of-service (QoS) flow handling, acts as external protocol data unit session point of interconnect to the data network 240, and functions as an anchor point for intra-radio access technology mobility and inter-radio access technology mobility.

The serving PLMN 210 may, in some examples, be a HPLMN or a VPLMN for the UE 115-*a*. The UE 115-*a* may be configured to select an N3IWF. An HPLMN may configure the UE 115-*a* with various information. In some examples, the HPLMN may configure the UE 115-*a* with a packet gateway identifier configuration. In some cases, the packet gateway may be an example of an evolved packet data gateway (ePDG), and the packet gateway identifier configuration may be an example of an ePDG identifier configuration. In some case, the packet gateway may be an example of a Non-3GPP Interworking Function, and the packet gateway identifier configuration may be an example of an N31WF identifier configuration. The packet gateway identifier configuration may include an FQDN. The FQDN may define a location of a network node within a DNS. FQDNs may also allow the DNS to trace an address of a network node, such as a server, through a DNS tree hierarchy to a top level domain and eventually to a root name server. In some other examples, the packet gateway identifier configuration may include an IP address of an packet gateway in the HPLMN. The HPLMN may configure the UE 115-*a* with the packet gateway identifier configuration based at least in part on the UE 115-*a* supporting connectivity with an packet gateway and attempting to select an packet gateway in the wireless communications system 200.

The HPLMN may configure the UE 115-*a* with an N3IWF identifier configuration. The N3IWF identifier configuration may include an FQDN or an IP address of a N3IWF in the HPLMN. In other examples, the HPLMN may configure the UE 115-*a* with non-3GPP access node selection information, which may include a list of PLMNs. In some examples, each PLMN in the list of PLMNs may be associated with a priority. Each PLMN may also be associated with one or more fields defining a parameter. For example, each PLMN may be configured with a preference field, which may identify if an packet gateway or an N3IWF is preferred for a corresponding PLMN. Additionally or alternatively, each PLMN may be configured with an FQDN field that identifies if the UE 115-*a* uses a tracking and location area identity FQDN or an operator identifier FQDN, for discovering an address of an packet gateway or an N3IWF in a corresponding PLMN. In some examples, the list of PLMNs may include a HPLMN field and a PLMN entry field, which matches a PLMN the UE 115-*a* is connected to except the HPLMN. The packet gateway identifier configuration and the N3IWF identifier configuration may be optional parameters for the UE 115-*a*. The non-3GPP access node selection information might not be optional and may include at least the HPLMN field and the PLMN entry field.

The UE 115-*a* may determine to select an packet gateway in the HPLMN based at least in part on that the UE 115-*a* is configured with the packet gateway identifier configuration. The UE 115-*a* may use the packet gateway identifier configuration to identify an IP address of the packet gateway in the HPLMN, and may ignore an FQDN field of the HPLMN in the non-3GPP access node selection information. In some examples, the UE 115-*a* may determine to select an N3IWF in the HPLMN based at least in part on that the UE 115-*a* is configured with the N3IWF identifier configuration. The UE 115-*a* may use the N3IWF identifier configuration to identify an IP address of an N3IWF in the HPLMN, and may ignore an FQDN field of the HPLMN in the non-3GPP access node selection information.

The UE 115-*a* may be configured to select an SN N3IWF, such as the SNPN N3IWF 235. In some examples, the UE 115-*a* may be configured to select an SN N3IWF based on selecting an packet gateway. As part of selecting an SN N3IWF, the UE 115-*a* may determine a tracking and location area identifier FQDN based at least in part on a tracking area where the UE 115-*a* is located. The tracking and location area identifier FQDN may use a 5G system (5GS) tracking area identity (TAI) when the UE 115-*a* is registered to the 5GS, or an evolved packet system (EPS) TAI when the UE 115-*a* is registered to an EPS. In some examples, an packet gateway operator identifier (OI) FQDN format may be substituted with an N3IWF OI FQDN format. The packet gateway identifier configuration and the packet gateway selection information may also be substituted by the N3IWF identifier configuration and the non-3GPP access node selection information. The UE 115-*a* may assign a preference to the N3IWF in all PLMNs in the non-3GPP access node selection information independent of the preference parameter. In some examples, network slice information might not be used for the N3IWF selection. Therefore, the UE 115-*a* may access an SNPN service via a PLMN by using a configured N3IWF FQDN to select an N3IWF deployed in the NPN.

An N3IWF FQDN may be provisioned by a home operator or constructed by the UE 115-*a* in either the OI FQDN format or the TAI FQDN format. The N3IWF FQDN may be used as input to a DNS for N3IWF selection. In some examples, for the UE 115-*a* to access PLMN services via an SNPN, the UE 115-*a* operating in SNPN access mode registered to an SNPN (e.g., the SNPN 225) may use the N3IWF selection procedure. The UE 115-*a* may, in some examples, use TAIs from a PLMN to construct a TAI-based N3IWF FQDN. The UE 115-*a* may, in some examples, ignore an N3IWF FQDN for N3IWF selection configured by an SNPN (e.g., the SNPN 225). In order to access SNPN services via a PLMN, an SNPN-enabled UE registered to a PLMN may use a configured N3IWF FQDN to select an N3IWF in an SNPN (e.g., the SNPN 225).

The UE 115-*a* may be configured to determine if a visited geographic location (e.g., a visited country) involves selection of N3IWF for the visited geographic location. In some examples, in order to determine if the visited geographic location (e.g., a visited country) demands selection of N3IWF, the UE 115-*a* may perform a DNS NAPTR query using the visited geographic location's FQDN (e.g., visited country FQDN) via a non-3GPP access network (e.g., the RAN 205). The visited geographic location's FQDN (e.g., visited country FQDN) may be used by the roaming UE 115-*a* to determine whether the visited geographic location (e.g., visited country) requires the selection of an packet gateway in the visited geographic location.

The visited geographic location FQDN may include a geographic location identifier that may define a territory in which the UE 115-*a* is located. For example, the visited geographic location FQDN may include an MCC, which may define a country in which the UE 115-*a* is located. The visited geographic location FQDN may include one or more labels, which may define one or more parameters associated with the wireless communications system 200. For example, a visited country FQDN may include seven labels. The first and second labels may be n3iwf.5gc. The third label may uniquely identify an MCC of the visited country. The last three labels may be pub.3gppnetwork.org. The fourth label may be visited-country. As a result, the resulting visited country FQDN may be n3iwf.5gc.mcc<MCC>.visited-country.pub.3gppnetwork.org. The geographic location identifier in the visited geographic location FQDN may be defined by one or more digits. For example, coding of the MCC in the visited geographic location FQDN may be defined by 3 digits. As an example, the visited geographic location FQDN (e.g., visited country FQDN) for MCC 345 is coded in a DNS as: n3iwf.5gc.mcc345.visited-country. pub.3gppnetwork.org.

In some examples, if a visited geographic location (e.g., a visited country) requires selection of a packet gateway (e.g., an ePDG or an N3IWF), the NAPTR records associated with the visited geographic location FQDN (e.g., a visited country FQDN) may be provisioned with a replacement field including an identity of one or more PLMNs in the geographic location (e.g., the visited country) which may be used for packet gateway selection. The replacement field may have a format similar to an OI-based packet gateway or an N3IWF FQDN composed of multiple labels (e.g., at least seven labels). Therefore, the first two labels shall be n3iwf.5gc. The third and fourth labels together may identify a PLMN. The last three labels may be pub.3gppnetwork.org. The result of the FQDN may be epdg.epc.mnc<MNC>. mcc<MCC>.pub.3gppnetwork.org.

For geographic locations (e.g., countries) with multiple a geographic location identifier (e.g., multiple MCCs), the NAPTR records returned by the DNS may include a different MCC than the MCC indicated in by the visited geographic location FQDN (e.g., a visited country FQDN). As an example, the NAPTR records associated with the visited geographic location FQDN (e.g., a visited country FQDN) for MCC 345, and for a mobile network code (MNC): 012, 013 and 014, may be provisioned in the DNS as N3iwf.5gc.mcc345.visited-country.pub.3gppnetwork.org and:

IN NAPTR order pref. flag service regexp replacement
    IN NAPTR 100 999 " " " " N3iwf5gc.mnc012. mcc345.
        pub.3gppnetwork.org
    IN NAPTR 100 999 " " " " N3iwf5gc.mnc013. mcc345.
        pub.3gppnetwork.org
    IN NAPTR 100 999 " " " " N3iwf5gc.mnc014.mcc345.
        pub.3gppnetwork.org If the result of the above query is a set of one or more records including the service instance names of the form n3iwf.5gc. mnc<MNC>.mcc<MCC>.pub.3gppnetwork.org, the UE 115-*a* may determine that the visited geographic location (e.g., visited country) mandates the selection of the N3IWF in the visited geographic location. Otherwise, if there are no records including the service instance names of the form n3aiwf.5gc.mnc<MNC>.mcc<MCC>.pub.3gppnetwork.org, the UE 115-*a* may determine that the visited geographic location (e.g., visited country) does not require the selection of the N3IWF.

Accordingly, the UE 115-*a* may access SNPN services using untrusted non-3GPP mechanisms by using the SNPN N3IWF 235 in the SNPN 225, and treating a registered PLMN as an untrusted access. In some examples, the UE 115-*a* may have a subscription with an NPN in a home geographic location (e.g., a home country). In some other examples, the UE 115-*a* may have a subscription with an HPLMN and may be roaming and be served by a VPLMN. In other examples, the UE 115-*a* may use a subscription with a serving PLMN in a serving geographic location (e.g., a serving country), and therefore is not roaming, but the serving geographic location may be different from the home geographic location (e.g., home country) where the NPN is located. In some examples, there might not be an agreement between the NPN and various VPLMNs.

An N3IWF selection technique (e.g., an algorithm) may have to consider legal interception (LI) requirements. If the serving geographic location (e.g., a serving country) mandates that the N3IWF has to be selected in a visited geographic location (e.g., a visited country), in the examples above the UE 115-*a* might not be capable of selecting an N3IWF for the SNPN in the geographic location (e.g., county) of the SNPN. As demand for access to SNPN services increases, it may be desirable for the UE 115-*a* to provide improvements to PLMN connectivity to support high reliability and low latency access to the SNPN services.

An NPN may establish an agreement (e.g., a configuration) with one or more VPLMNs in various geographic locations (e.g., various countries) where LI requirements require selection of an N3IWF in a corresponding serving geographic location (e.g., a serving country), so that an N3IWF for the NPN may be selected in a visited geographic location (e.g., a visited country). In some examples, the UE 115-*a* may be configured with a list of SNPN N3IWFs including MCCs and NPN N3IWF identifiers. For example, the UE 115-*a* may be configured with an SNPN-N3IWF-List of MCC and NPN N3IWF Identifier tuples. The NPN N3IWF identifier may be an FQDN or an IP address. The UE 115-*a* may also be configured with a home NPN N3IWF (HomeHPN-N3IWF) identifier.

The UE 115-*a* may identify a geographic location (e.g., a country) that the UE 115-*a* is located, and may determine if the identified geographic location is associated with an entry in the list of SNPN N3IWFs. For example, the UE 115-*a* may determine that an MCC of the identified geographic location matches an MCC entry in the list of SNPN N3IWFs. That is, the UE 115-*a* may determine that the MCC of a serving country (e.g., an MCC of a serving PLMN) matches an MCC entry in the SNPN-N3IWF-List. In some examples, when the UE 115-*a* is located in a geographic location that is in the list of list of SNPN N3IWFs, the UE 115-*a* may use the NPN N3IWF identifier to select an N3IWF, and may ignore other operations of a N3IWF selection procedure including determining if an N3IWF has to be selected in the geographic location. Alternatively, if the UE 115-*a* is located in a geographic location (e.g., a country) that is not present in the SNPN-N3IWF-List, the UE 115-*a* may be configured with a HomeNPN-N3IWF identifier and may proceed with the N3IWF selection procedure. The UE 115-*a* may determine whether an N3IWF has to be selected in the geographic location (e.g., a visited country). If not, the UE 115-*a* may use the HomeNPN-N3IWF identifier to select the N3IWF. Otherwise, the UE 115-*a* may terminate the N3IWF selection procedure.

In some other examples, the UE 115-*a* may be configured with a list of geographic locations where the UE 115-*a* may select an NPN N3IWF in a default geographic location (also referred to as a home geographic location). In other words, the UE 115-*a* may be configured with a list of countries (e.g., MCC codes), where the UE 115-*a* may select an NPN N3IWF in a home country. If the UE 115-*a* is not located in a geographic location corresponding to one of the configured geographic locations in the list of geographic locations, the UE 115-*a* may terminate an N3IWF selection procedure. For example, if the UE 115-*a* is not located in a country corresponding to one of the configured MCCs, the UE 115-*a* may stop an N3IWF selection procedure. Otherwise, the UE 115-*a* may use a configured HomeNPN-N3IWF identifier to select the N3IWF.

The UE 115-*a* may be configured to discover one or multiple N3IWFs based at least in part on an N3IWF discovery procedure. In some examples, when the UE 115-*a* performs a DNS query to discover whether an N3IWF has to be selected for a visited geographic location (e.g., a visited country) or can be selected in a default geographic location (e.g., a home country), the UE 115-*a* may receive an indication that selection of an N3IWF for NPNs is not subject to local LI requirements, and therefore the UE 115-*a* can select an N3IWF for NPN in another geographic location (e.g., another country). The UE 115-*a* may perform a DNS NAPTR query using a visited geographic location FQDN (e.g., a visited country FQDN) via a non-3GPP access network. The NAPTR records associated with the visited geographic location FQDN (e.g., a visited country FQDN) returned to the UE 115-*a* may be provisioned with the replacement field including the identity of the one or multiple PLMNs in the visited geographic location, which may be used for N3IWF selection. The NAPTR records may also include an indication identifying that the N3IWF selection for NPNs is not subject to local LI requirements.

In some other examples, when the UE 115-*a* performs a DNS query to discover whether an N3IWF has to be selected for a visited geographic location (e.g., a visited country) or can be selected in a default geographic location (e.g., a home country), the UE 115-*a* may be provided a list of NPNs exempt from the local LI requirements and for which the UE 115-*a* can select an N3IWF for NPN in another geographic location (e.g., another country). The UE 115-*a* may perform a DNS NAPTR query using a visited geographic location's FQDN (e.g., a visited country FQDN) via a non-3GPP access network. The NAPTR records associated with the visited geographic location's FQDN returned to the UE 115-*a* may be provisioned with the replacement field including an identity of one or multiple PLMNs in the visited geographic location. The UE 115-*a* may determine the identities provisioned in the replacement filed for N3IWF selection. The NAPTR records may also include a list of SNPNs for which the UE 115-*a* can select an N3IWF for NPN in another geographic location (e.g., another country).

The UE 115-*a* may be configured to transmit a message including an indication that an N3IWF discovery is for an SNPN N3IWF in a DNS query. In some examples, the UE 115-*a* may receive a message including an indication that selection of N2IWF for an NPN is not subject to local LI requirements. The UE 115-*a* may perform a DNS NAPTR query using a visited geographic location's FQDN (e.g., a visited country FQDN) via a non-3GPP access network. The UE 115-*a* may generate the visited geographic location's FQDN using an MCC that uniquely identifies a geographic location (e.g., a country) in which the UE 115-*a* is located. A visited country FQDN may include seven labels. The first and second labels may be n3iwf.snpn. The third label may uniquely identify the MCC of the visited geographic location (e.g., visited country). The fourth label may be a visited country. The last three labels may be pub.3gppnetwork.org. The resulting visited country FQDN may be n3iwfsnpn.mcc <MCC>.visited-country.pub.3gppnetwork.org. If the visited country requires selection of N3IWF for SNPNs, then the NAPTR records associated with the visited country FQDN may be provisioned with the replacement field including the identity of the one or multiple PLMNs in the visited country which may be used for packet gateway selection. Otherwise, the query shall return no record containing any service instance names of the form n3iwf.5gc.mnc <MNC>. mcc<MCC>.pub.3gppnetwork.org.

Alternatively, the UE 115-*a* may be configured to transmit a message including an identifier of an NPN in a DNS query, and the UE 115-*a* may receive a message including an indication that selection of an N3IWF for the NPN is not subject to local LI restrictions. The UE 115-*a* may perform a DNS NAPTR query using a visited geographic location's FQDN (e.g., a visited country FQDN) via a non-3GPP access network. The UE 115-*a* may generate the visited geographic location's FQDN using an MCC that uniquely identifies a geographic location (e.g., a country) in which the UE 115-*a* is located. A visited country FQDN may include eight labels. The first label may identify an identity of an SNPN in a format of PLMN ID and NID of the SNPN. The second and third labels may be n3iwf.snpn. The fourth label may uniquely identify an MCC of the visited country. The fifth label may identify the visited-country. The last three labels may be pub.3gppnetwork.org. The resulting visited country FQDN may be: SNPNPLMNIDNID. n3iwfsnpn. mcc<MCC>.visited-country.pub.3gppnetwork.org. If the visited country requires selection of N3IWF for the SNPN indicated by the UE 115-*a* in the DNS NAPTR query, then the NAPTR records associated with the visited country FQDN may be provisioned with the replacement field including an identity of the one or multiple PLMNs in the visited country which may be used for packet gateway selection. Otherwise, the query shall return no record containing any service instance names of the form n3iwf. 5gc.mnc<MNC>.mcc<MCC>.pub.3gppnetwork.org.

In some examples, if the result of the query is a set of one or more records containing the service instance names of the form n3 iwf.5gc.mnc<MNC>.mcc<MCC>.pub. 3gppnetwork.org, the UE 115-*a* may determine that the visited country mandates the selection of the N3IWF in this country. Otherwise, if the result of the query is no records containing the service instance names of the form n3 iwf.5gc.mnc <MNC>. mcc<MCC>.pub.3gppnetwork.org, the UE 115-*a* may determine that the visited country does not mandate the selection of the N3IWF in this country.

The wireless communications system 200 may therefore provide benefits and enhancements to the operation of the UE 115-*a*. In some examples, operations performed by the UE 115-*a* may provide improvements to wireless communications in the wireless communications system 200. In some other examples, configuring the UE 115-*a* to manage wireless communications over private wireless networks by improving gateway selection for the private wireless networks may support improvements to power consumption, spectral efficiency, and, in some examples, may promote high reliability and low latency wireless communications, among other benefits for the UE 115-*a*.

Figure 3:
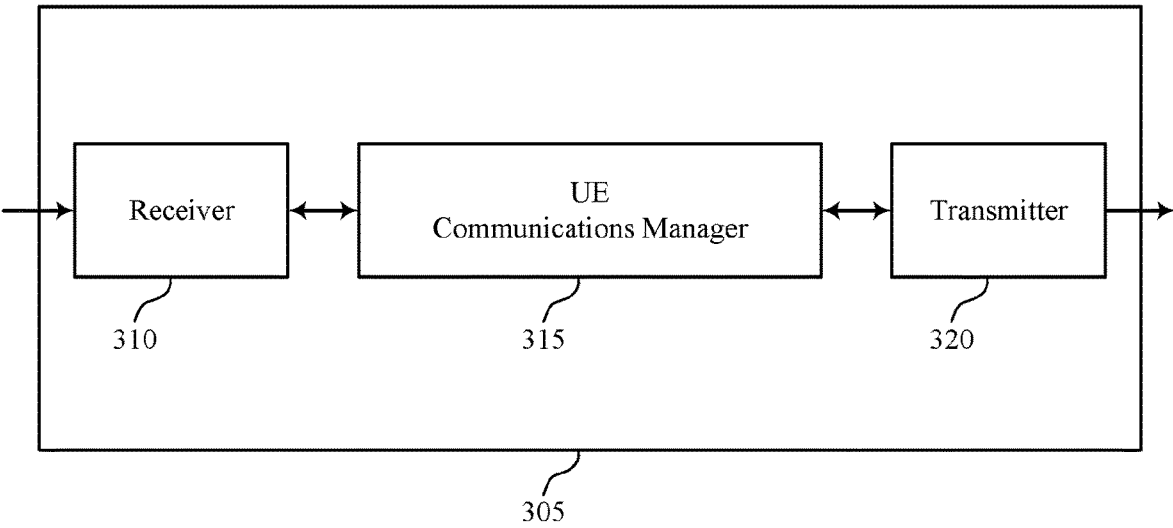
FIGS. 3 and 4 show block diagrams of devices in accordance with one or more aspects of the present disclosure.

FIG. 3 shows a block diagram 300 of a device 305 in accordance with one or more aspects of the present disclosure. The device 305 may be an example of aspects of a UE 115 as described herein. The device 305 may include a receiver 310, a UE communications manager 315, and a transmitter 320. The device 305 may also include a processor. Each of these components may be in communication with one another (e.g., via one or more buses).

The receiver 310 may receive information such as packets, user data, or control information associated with various information channels (e.g., control channels, data channels, and information related to gateway selection for private wireless networks, etc.). Information may be passed on to other components of the device 305. The receiver 310 may be an example of aspects of the transceiver 620 described with reference to FIG. 6. The receiver 310 may utilize a single antenna or a set of antennas.

The UE communications manager 315 may receive a message including at least one geographic location code, determine whether a geographic location code associated with a geographic location of the UE matches at least one geographic location code in the received message, and select an NPN function based on the determining. The UE communications manager 315 may also determine that an NPN function selection for a geographic location of the UE is independent of an interception condition associated with the geographic location, discover a set of NPN functions based on the determining, and select at least one NPN function of the set of NPN functions for an NPN associated with the geographic location of the UE, where the geographic location of the UE is different from a default geographic location associated with the UE.

The UE communications manager 315 may also provide a first indication of at least one of an SNPN function or a second indication of an NPN, or both, for a query operation, discover a set of NPN functions based on the query operation, and select at least one NPN function of the set of NPN functions based on determining that NPN function selection for a geographic location of the UE is independent of an interception condition associated with the geographic location. The UE communications manager 315 may be an example of aspects of the UE communications manager 610 described herein.

The UE communications manager 315 may be implemented as an integrated circuit or chipset for a modem, and the receiver 310 and the transmitter 320 may be implemented as analog components (e.g., amplifiers, filters, antennas, etc.) coupled with the modem to enable wireless transmission and reception for the device 305. The UE communications manager 315 as described herein may be implemented to realize one or more potential advantages. Various implementations may enable power saving for the device 305. At least one implementation may enable the UE communications manager 315 to effectively select and connect to a private network using techniques described herein, and thereby reducing power consumption with operations related to the connecting to the private network.

The UE communications manager 315, or its sub-components, may be implemented in hardware, code (e.g., software or firmware) executed by a processor, or any combination thereof. If implemented in code executed by a processor, the functions of the UE communications manager 315, or its sub-components may be executed by a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described in the present disclosure.

The UE communications manager 315, or its sub-components, may be physically located at various positions, including being distributed such that portions of functions are implemented at different physical locations by one or more physical components. In some examples, the UE communications manager 315, or its sub-components, may be a separate and distinct component in accordance with various aspects of the present disclosure. In some examples, the UE communications manager 315, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 320 may transmit signals generated by other components of the device 305. In some examples, the transmitter 320 may be collocated with a receiver 310 in a transceiver module. For example, the transmitter 320 may be an example of aspects of the transceiver 620 described with reference to FIG. 6. The transmitter 320 may utilize a single antenna or a set of antennas.

Figure 4:
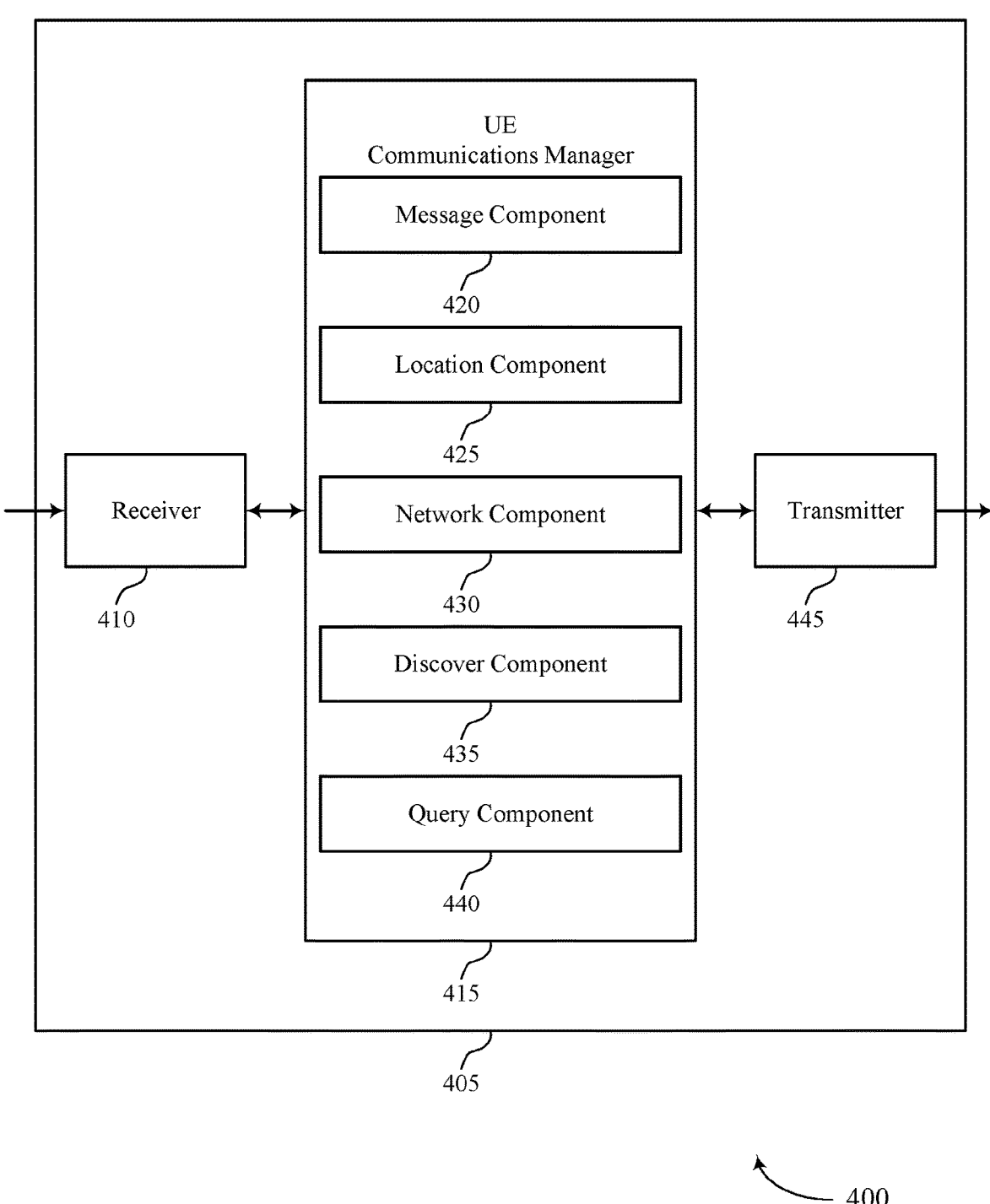

FIG. 4 shows a block diagram 400 of a device 405 in accordance with one or more aspects of the present disclosure. The device 405 may be an example of aspects of a device 305, or a UE 115 as described herein. The device 405 may include a receiver 410, a UE communications manager 415, and a transmitter 445. The device 405 may also include a processor. Each of these components may be in communication with one another (e.g., via one or more buses).

The receiver 410 may receive information such as packets, user data, or control information associated with various information channels (e.g., control channels, data channels, and information related to gateway selection for private wireless networks, etc.). Information may be passed on to other components of the device 405. The receiver 410 may be an example of aspects of the transceiver 620 described with reference to FIG. 6. The receiver 410 may utilize a single antenna or a set of antennas.

The UE communications manager 415 may be an example of aspects of the UE communications manager 315 as described herein. The UE communications manager 415 may include a message component 420, a location component 425, a network component 430, a discover component 435, and a query component 440. The UE communications manager 415 may be an example of aspects of the UE communications manager 610 described herein.

The message component 420 may receive a message including at least one geographic location code. The location component 425 may determine whether a geographic location code associated with a geographic location of the UE matches at least one geographic location code in the received message. The network component 430 may select an NPN function based on the determining.

The network component 430 may determine that an NPN function selection for a geographic location of the UE is independent of an interception condition associated with the geographic location. The discover component 435 may discover a set of NPN functions based on the determining and select at least one NPN function of the set of NPN functions for an NPN associated with the geographic location of the UE, where the geographic location of the UE is different from a default geographic location associated with the UE.

The query component 440 may provide a first indication of at least one of an SNPN function or a second indication of an NPN, or both, for a query operation. The discover component 435 may discover a set of NPN functions based on the query operation. The network component 430 may select at least one NPN function of the set of NPN functions based on determining that NPN function selection for a geographic location of the UE is independent of an interception condition associated with the geographic location.

The transmitter 445 may transmit signals generated by other components of the device 405. In some examples, the transmitter 445 may be collocated with a receiver 410 in a transceiver module. For example, the transmitter 445 may be an example of aspects of the transceiver 620 described with reference to FIG. 6. The transmitter 445 may utilize a single antenna or a set of antennas.

Figure 5:
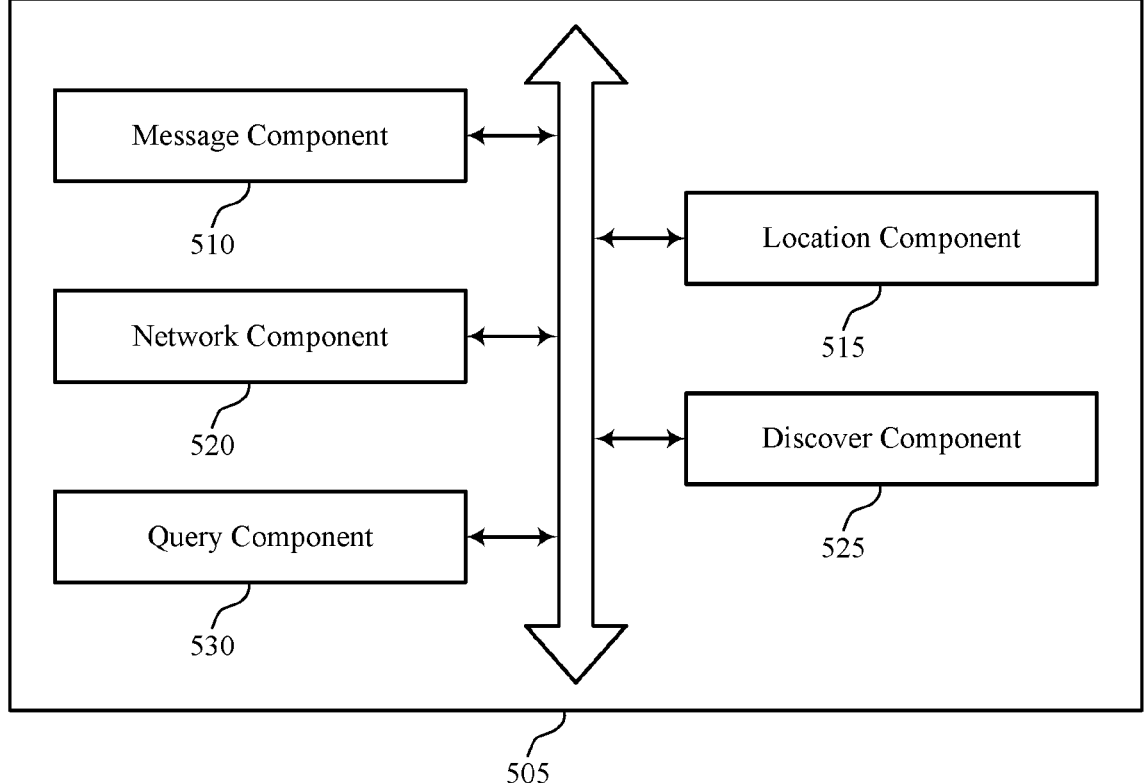
FIG. 5 shows a block diagram of a UE communications manager in accordance with one or more aspects of the present disclosure.

FIG. 5 shows a block diagram 500 of a UE communications manager 505 in accordance with one or more aspects of the present disclosure. The UE communications manager 505 may be an example of aspects of a UE communications manager 315, a UE communications manager 415, or a UE communications manager 610 described herein. The UE communications manager 505 may include a message component 510, a location component 515, a network component 520, a discover component 525, and a query component 530. Each of these modules may communicate, directly or indirectly, with one another (e.g., via one or more buses).

The message component 510 may receive a message including at least one geographic location code. In some examples, the message component 510 may receive a list including a set of tuples including the geographic location codes or the NPN function identifiers, or both. In some examples, the message component 510 may receive a default NPN function identifier. In some examples, the message component 510 may receive a message including an indication that the NPN function selection for the geographic location of the UE is independent of the interception condition associated with the geographic location, where selecting the at least one NPN function of the set of NPN functions for the NPN associated with the geographic location of the UE is based on the received message including the indication.

In some examples, the message component 510 may receive a message including a list of NPNs that are independent of the interception condition associated with the geographic location, where selecting the at least one NPN function of the set of NPN functions for the NPN associated with the geographic location of the UE is based on the list of NPNs that are independent of the interception condition. In some cases, the message includes NPN function identifiers. In some cases, the NPN function identifier includes an NPN N3IWF identifier. In some cases, the NPN N3IWF identifier is an FQDN. In some cases, the NPN N3IWF identifier is an IP address. In some cases, the interception condition includes a local legal interception condition associated with the geographic location of the UE.

The location component 515 may determine whether a geographic location code associated with a geographic location of the UE matches at least one geographic location code in the received message. In some examples, the location component 515 may determine that a geographic location code of a serving PLMN matches at least one geographic location code associated with the geographic location codes in the received message. In some examples, the location component 515 may terminate the selection procedure based on selecting the NPN function using the NPN function identifier. In some examples, the location component 515 may refrain from determining whether selection of the NPN function is configured for the geographic location of the UE based on terminating the selection procedure.

In some cases, the location component 515 may determine that the geographic location code associated with the geographic location of the UE matches at least one geographic location code associated with the geographic location codes in the received message, where selecting the NPN function includes: selecting, based on a selection procedure, the NPN function using an NPN function identifier. In some cases, the location component 515 may determine that the geographic location code associated with the geographic location of the UE does not match at least one geographic location code associated with the geographic location codes in the received message. In some cases, the geographic location codes correspond to NPN functions in a default geographic location associated with the UE. In some cases, the geographic location codes include MMCs.

The network component 520 may select an NPN function based on the determining. In some examples, the network component 520 may determine that an NPN function selection for a geographic location of the UE is independent of an interception condition associated with the geographic location. In some examples, the network component 520 may select at least one NPN function of the set of NPN functions based on determining that NPN function selection for a geographic location of the UE is independent of an interception condition associated with the geographic location. In some examples, the network component 520 may perform a selection procedure to select the NPN function based on determining that the geographic location code associated with the geographic location of the UE does not match at least one geographic location code associated with the geographic location codes in the received message. In some examples, the network component 520 may select the NPN function using a default NPN function identifier based on determining that selection of the NPN function is not needed for the geographic location of the UE. In some examples, the network component 520 may select an NPN function based on placing an emergency call.

In some examples, the network component 520 may select the NPN function using a default NPN function identifier and based on determining that the geographic location code associated with the geographic location of the UE does not match at least one geographic location code associated with the geographic location codes in the received message. In some examples, the network component 520 may determine that the NPN function selection for the geographic location of the UE is independent of the interception condition associated with the geographic location is based on a query result of the query operation. In some cases, the NPN function includes an NPN N3IWF. In some cases, the query result includes a set of records including a service instance associated with an FQDN including a set of query labels.

The discover component 525 may discover a set of NPN functions based on the determining. In some examples, the discover component 525 may select at least one NPN function of the set of NPN functions for an NPN associated with the geographic location of the UE, where the geographic location of the UE is different from a default geographic location associated with the UE. In some examples, the discover component 525 may discover a set of NPN functions based on the query operation. The query component 530 may provide a first indication of at least one of an SNPN function or a second indication of an NPN, or both, for a query operation.

In some examples, the query component 530 may determine a domain name associated with the geographic location of the UE, where a query operation is performed using the domain name associated with the geographic location of the UE, and discovering the set of NPN functions is based on the performed query operation. In some examples, the query component 530 may receive a set of records related to the domain name associated with the geographic location of the UE based on the performed query operation, where selecting the at least one NPN function of the set of NPN functions for the NPN associated with the geographic location of the UE is based on at least one record of the set of records.

In some examples, the query component 530 may generate the domain name using a set of labels, where the domain name includes an FQDN. In some examples, the query component 530 may select an packet gateway based on the set of network identifiers associated with the set of PLMNs. In some cases, the query operation includes a DNS NAPTR query operation. In some cases, the set of records includes a set of network identifiers associated with a set of PLMNs. In some cases, the set of records includes an indication that the NPN function selection for the geographic location of the UE is independent of the interception condition associated with the geographic location.

In some cases, the set of records includes a list of SNPNs and selecting the at least one NPN function of the set of NPN functions for the NPN associated with the geographic location of the UE is based on the list of SNPNs. In some cases, the set of records includes a set of NAPRs. In some cases, the domain name includes an FQDN. In some cases, the query operation is performed using a domain name of the geographic location of the UE, where the geographic location of the UE is different from a default geographic location associated with the UE. In some cases, a first label of the set of labels includes an NPN function identifier. In some cases, a first label of the set of labels includes a PLMN identifier and a network identifier associated with an SNPN.

In some cases, a second label of the set of labels includes an SNPN identifier. In some cases, a third label of the set of labels includes a geographic location code identifying the geographic location in which the UE is located. In some cases, the geographic location code includes an MCC. In some cases, a fourth label of the set of labels includes a geographic location code identifying a visited geographic location of the UE. In some cases, one or more NAPTR records associated with the domain name of the geographic location include a set of network identifiers associated with a set of PLMNs. In some cases, the query operation includes a DNS NAPTR query operation. In some cases, the interception condition includes a local legal interception condition associated with the geographic location of the UE.

Figure 6:
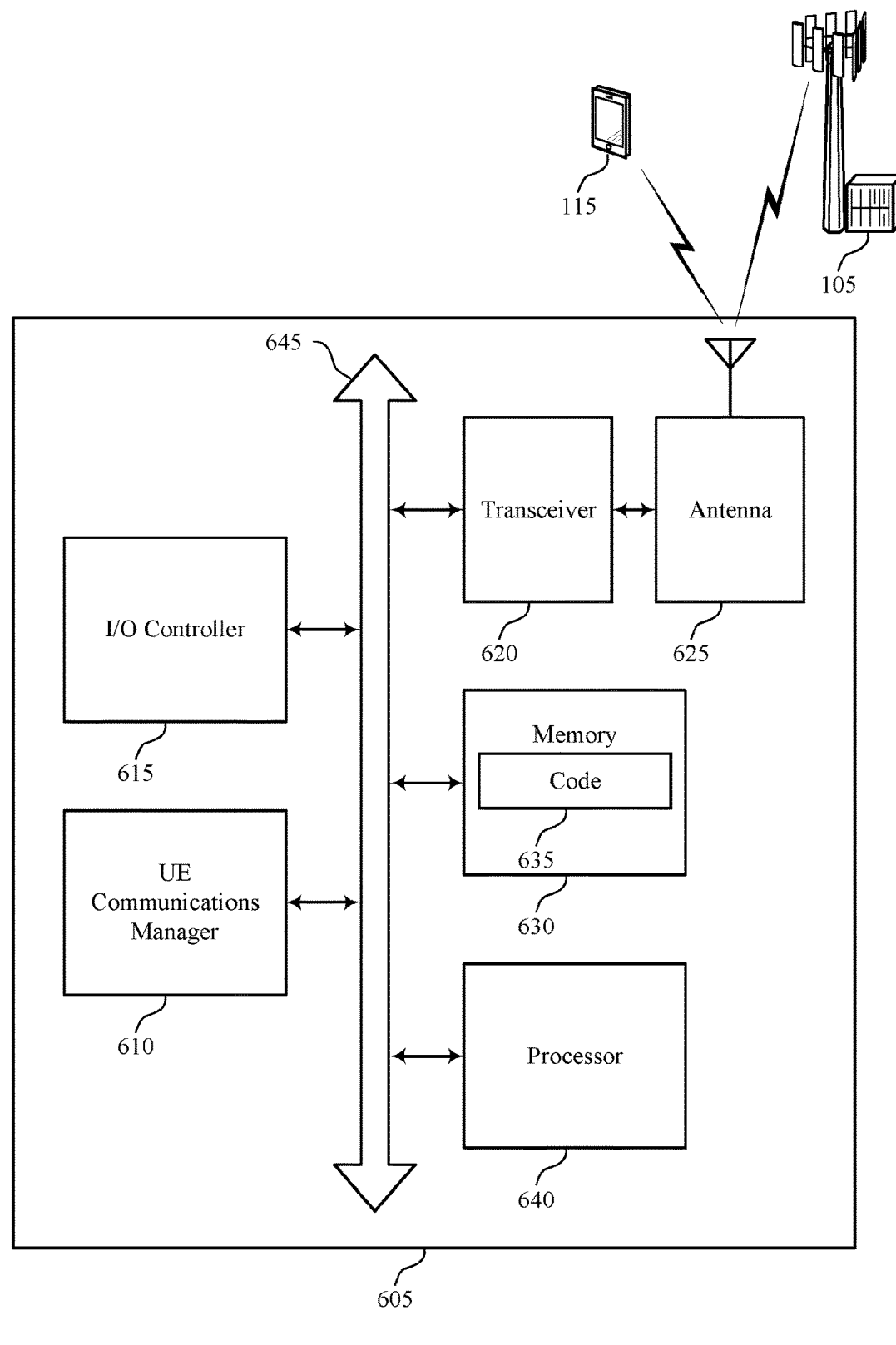
FIG. 6 shows a diagram of a system including a device in accordance with one or more aspects of the present disclosure.

FIG. 6 shows a diagram of a system 600 including a device 605 in accordance with one or more aspects of the present disclosure. The device 605 may be an example of or include the components of device 305, device 405, or a UE 115 as described herein. The device 605 may include components for bi-directional voice and data communications including components for transmitting and receiving communications, including a UE communications manager 610, an I/O controller 615, a transceiver 620, an antenna 625, memory 630, and a processor 640. These components may be in electronic communication via one or more buses (e.g., bus 645).

The UE communications manager 610 may receive a message including at least one geographic location code, determine whether a geographic location code associated with a geographic location of the UE matches at least one geographic location code in the received message, and select an NPN function based on the determining.

The UE communications manager 610 may also determine that an NPN function selection for a geographic location of the UE is independent of an interception condition associated with the geographic location, discover a set of NPN functions based on the determining, and select at least one NPN function of the set of NPN functions for an NPN associated with the geographic location of the UE, where the geographic location of the UE is different from a default geographic location associated with the UE.

The UE communications manager 610 may also provide a first indication of at least one of an SNPN function or a second indication of an NPN, or both, for a query operation, discover a set of NPN functions based on the query operation, and select at least one NPN function of the set of NPN functions based on determining that NPN function selection for a geographic location of the UE is independent of an interception condition associated with the geographic location.

The I/O controller 615 may manage input and output signals for the device 605. The I/O controller 615 may also manage peripherals not integrated into the device 605. In some cases, the I/O controller 615 may represent a physical connection or port to an external peripheral. In some cases, the I/O controller 615 may utilize an operating system such as iOS®, ANDROID®, MS-DOS®, MS-WINDOWS®, OS/2®, UNIX®, LINUX®, or another known operating system. In other cases, the I/O controller 615 may represent or interact with a modem, a keyboard, a mouse, a touchscreen, or a similar device. In some cases, the I/O controller 615 may be implemented as part of a processor. In some cases, a user may interact with the device 605 via the I/O controller 615 or via hardware components controlled by the I/O controller 615.

The transceiver 620 may communicate bi-directionally, via one or more antennas, wired, or wireless links as described above. For example, the transceiver 620 may represent a wireless transceiver and may communicate bi-directionally with another wireless transceiver. The transceiver 620 may also include a modem to modulate the packets and provide the modulated packets to the antennas for transmission, and to demodulate packets received from the antennas. In some cases, the device 605 may include a single antenna 625. However, in some cases, the device 605 may have more than one antenna 625, which may be capable of concurrently transmitting or receiving multiple wireless transmissions.

The memory 630 may include RAM and ROM. The memory 630 may store computer-readable, computer-executable code 635 including instructions that, when executed, cause the processor 640 to perform various functions described herein. In some cases, the memory 630 may contain, among other things, a BIOS which may control basic hardware or software operation such as the interaction with peripheral components or devices.

The code 635 may include instructions to implement aspects of the present disclosure, including instructions to support wireless communications. The code 635 may be stored in a non-transitory computer-readable medium such as system memory or other types of memory. In some cases, the code 635 may not be directly executable by the processor 640 but may cause a computer (e.g., when compiled and executed) to perform functions described herein.

The processor 640 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 640 may be configured to operate a memory array using a memory controller. In other cases, a memory controller may be integrated into the processor 640. The processor 640 may be configured to execute computer-readable instructions stored in a memory (e.g., the memory 630) to cause the device 605 to perform various functions (e.g., functions or tasks supporting gateway selection for private wireless networks).

Figure 7:
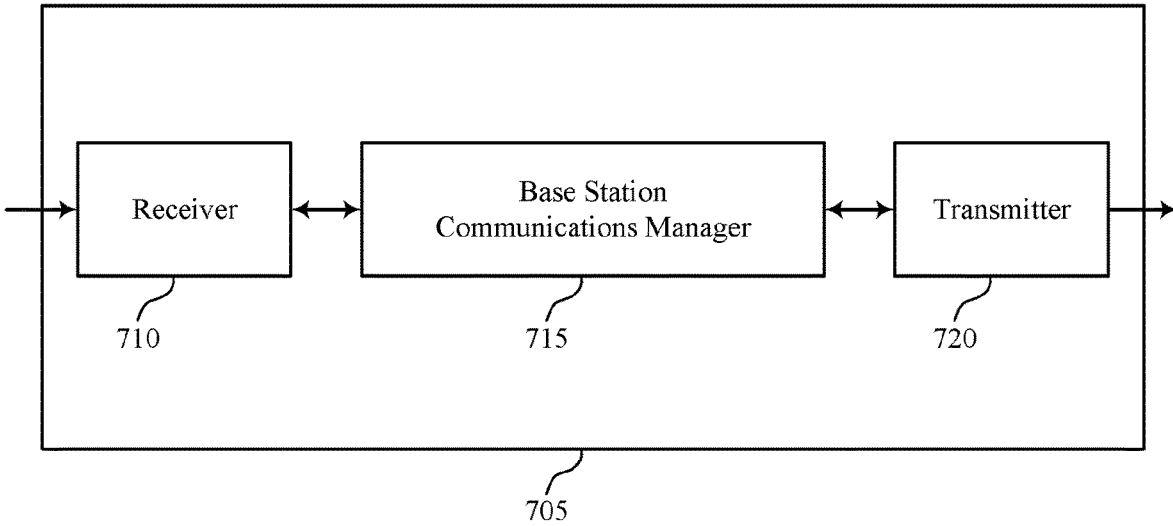
FIGS. 7 and 8 show block diagrams of devices in accordance with one or more aspects of the present disclosure.

FIG. 7 shows a block diagram 700 of a device 705 in accordance with one or more aspects of the present disclosure. The device 705 may be an example of aspects of a base station 105 as described herein. The device 705 may include a receiver 710, a base station communications manager 715, and a transmitter 720. The device 705 may also include a processor. Each of these components may be in communication with one another (e.g., via one or more buses).

The receiver 710 may receive information such as packets, user data, or control information associated with various information channels (e.g., control channels, data channels, and information related to gateway selection for private wireless networks, etc.). Information may be passed on to other components of the device 705. The receiver 710 may be an example of aspects of the transceiver 1020 described with reference to FIG. 10. The receiver 710 may utilize a single antenna or a set of antennas.

The base station communications manager 715 may receive a first indication of an SNPN or a second indication of an NPN, or both, determine a set of NPN functions based on a query operation, and provide the set of NPN functions. The base station communications manager 715 may be an example of aspects of the base station communications manager 1010 described herein.

The base station communications manager 715, or its sub-components, may be implemented in hardware, code (e.g., software or firmware) executed by a processor, or any combination thereof. If implemented in code executed by a processor, the functions of the base station communications manager 715, or its sub-components may be executed by a general-purpose processor, a DSP, an ASIC, an FPGA or other programmable logic device, discrete gate or transistor logic, discrete hardware components, or any combination thereof designed to perform the functions described in the present disclosure.

The base station communications manager 715, or its sub-components, may be physically located at various positions, including being distributed such that portions of functions are implemented at different physical locations by one or more physical components. In some examples, the base station communications manager 715, or its sub-components, may be a separate and distinct component in accordance with various aspects of the present disclosure. In some examples, the base station communications manager 715, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 720 may transmit signals generated by other components of the device 705. In some examples, the transmitter 720 may be collocated with a receiver 710 in a transceiver module. For example, the transmitter 720 may be an example of aspects of the transceiver 1020 described with reference to FIG. 10. The transmitter 720 may utilize a single antenna or a set of antennas.

Figure 8:
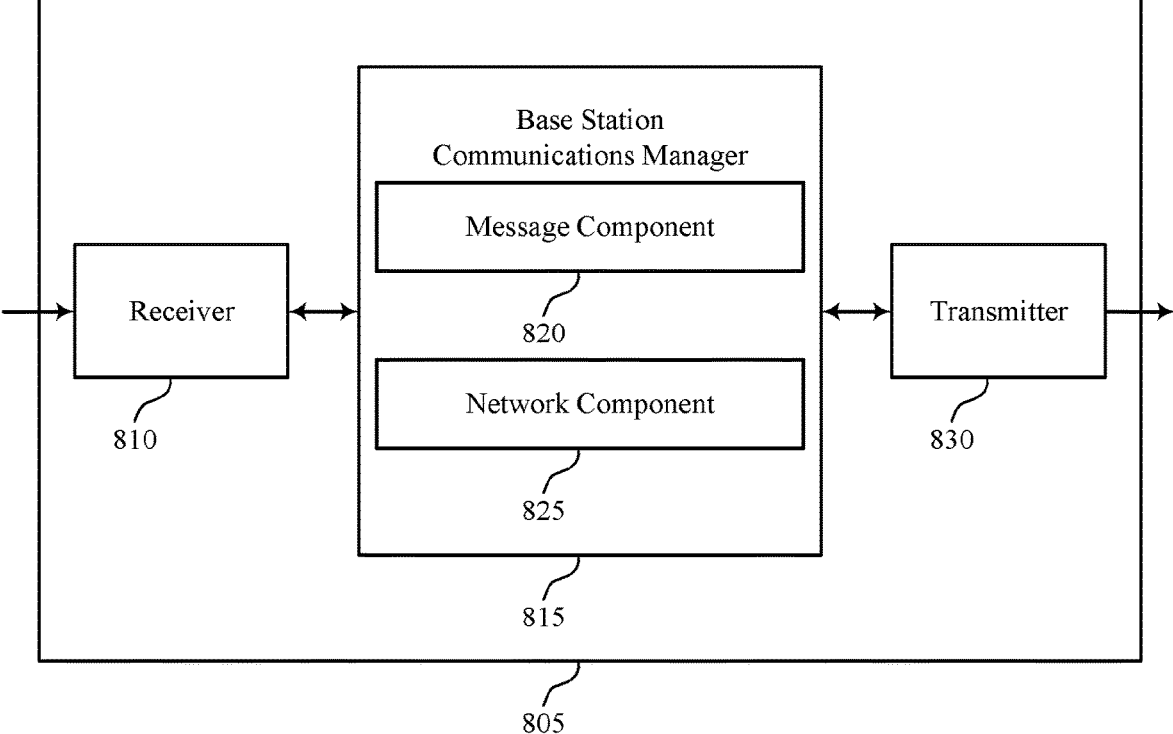

FIG. 8 shows a block diagram 800 of a device 805 in accordance with one or more aspects of the present disclosure. The device 805 may be an example of aspects of a device 705, or a base station 105 as described herein. The device 805 may include a receiver 810, a base station communications manager 815, and a transmitter 830. The device 805 may also include a processor. Each of these components may be in communication with one another 60 (e.g., via one or more buses).

The receiver 810 may receive information such as packets, user data, or control information associated with various information channels (e.g., control channels, data channels, and information related to gateway selection for private wireless networks, etc.). Information may be passed on to other components of the device 805. The receiver 810 may be an example of aspects of the transceiver 1020 described with reference to FIG. 10. The receiver 810 may utilize a single antenna or a set of antennas.

The base station communications manager 815 may be an example of aspects of the base station communications manager 715 as described herein. The base station communications manager 815 may include a message component 820 and a network component 825. The base station communications manager 815 may be an example of aspects of the base station communications manager 1010 described herein. The message component 820 may receive a first indication of an SNPN or a second indication of an NPN, or both. The network component 825 may determine a set of NPN functions based on a query operation and provide the set of NPN functions.

The transmitter 830 may transmit signals generated by other components of the device 805. In some examples, the transmitter 830 may be collocated with a receiver 810 in a transceiver module. For example, the transmitter 830 may be an example of aspects of the transceiver 1020 described with reference to FIG. 10. The transmitter 830 may utilize a single antenna or a set of antennas.

Figure 9:
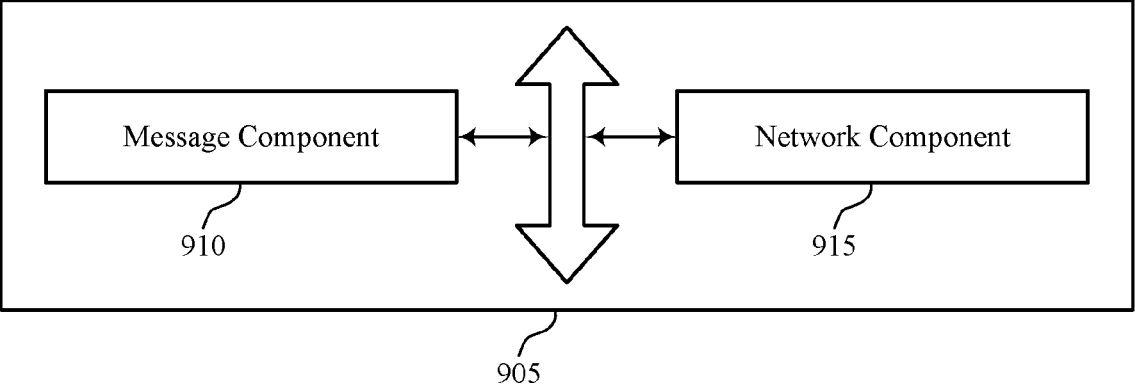
FIG. 9 shows a block diagram of a base station communications manager in accordance with one or more aspects of the present disclosure.

FIG. 9 shows a block diagram 900 of a base station communications manager 905 in accordance with one or more aspects of the present disclosure. The base station communications manager 905 may be an example of aspects of a base station communications manager 715, a base station communications manager 815, or a base station communications manager 1010 described herein. The base station communications manager 905 may include a message component 910 and a network component 915. Each of these modules may communicate, directly or indirectly, with one another (e.g., via one or more buses). The message component 910 may receive a first indication of an SNPN or a second indication of an NPN, or both. The network component 915 may determine a set of NPN functions based on a query operation. In some examples, the network component 915 may provide the set of NPN functions. In some cases, the set of NPN functions includes an NPN N3IWFs. In some cases, the query operation includes a DNS NAPTR query operation.

Figure 10:
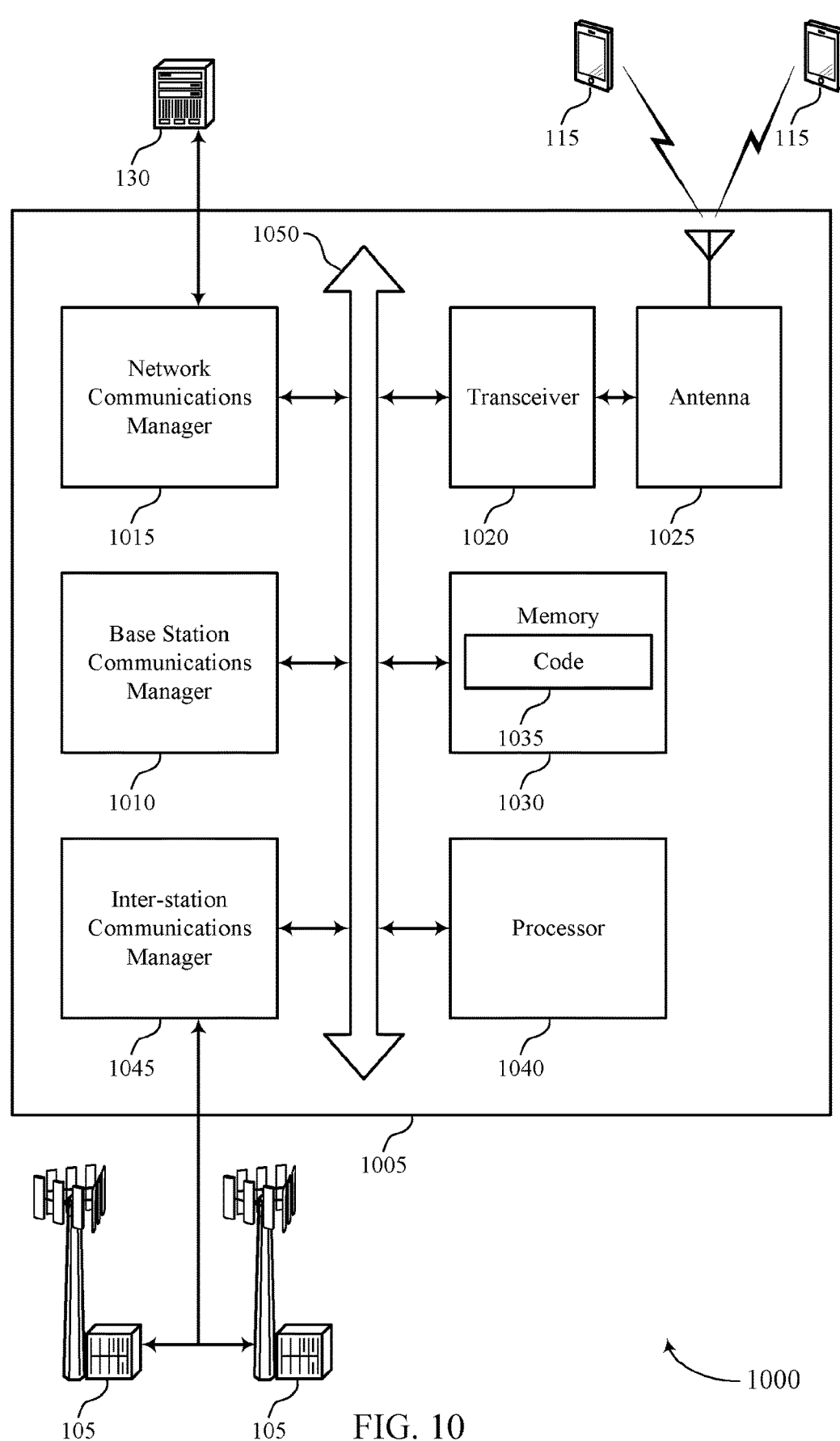
FIG. 10 shows a diagram of a system including a device in accordance with one or more aspects of the present disclosure.

FIG. 10 shows a diagram of a system 1000 including a device 1005 in accordance with one or more aspects of the present disclosure. The device 1005 may be an example of or include the components of device 705, device 805, or a base station 105 as described herein. The device 1005 may include components for bi-directional voice and data communications including components for transmitting and receiving communications, including a base station communications manager 1010, a network communications manager 1015, a transceiver 1020, an antenna 1025, memory 1030, a processor 1040, and an inter-station communications manager 1045. These components may be in electronic communication via one or more buses (e.g., bus 1050).

The base station communications manager 1010 may receive a first indication of an SNPN or a second indication of an NPN, or both, determine a set of NPN functions based on a query operation, and provide the set of NPN functions. The network communications manager 1015 may manage communications with the core network (e.g., via one or more wired backhaul links). For example, the network communications manager 1015 may manage the transfer of data communications for client devices, such as one or more UEs 115.

The transceiver 1020 may communicate bi-directionally, via one or more antennas, wired, or wireless links as described above. For example, the transceiver 1020 may represent a wireless transceiver and may communicate bi-directionally with another wireless transceiver. The transceiver 1020 may also include a modem to modulate the packets and provide the modulated packets to the antennas for transmission, and to demodulate packets received from the antennas. In some cases, the device 1005 may include a single antenna 1025. However, in some cases, the device 1005 may have more than one antenna 1025, which may be capable of concurrently transmitting or receiving multiple wireless transmissions.

The memory 1030 may include RAM, ROM, or a combination thereof. The memory 1030 may store computer-readable code 1035 including instructions that, when executed by a processor (e.g., the processor 1040) cause the device to perform various functions described herein. In some cases, the memory 1030 may contain, among other things, a BIOS which may control basic hardware or software operation such as the interaction with peripheral components or devices. The code 1035 may include instructions to implement aspects of the present disclosure, including instructions to support wireless communications. The code 1035 may be stored in a non-transitory computer-readable medium such as system memory or other types of memory. In some cases, the code 1035 may not be directly executable by the processor 1040 but may cause a computer (e.g., when compiled and executed) to perform functions described herein.

The processor 1040 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In some cases, a memory controller may be integrated into processor 1040. The processor 1040 may be configured to execute computer-readable instructions stored in a memory (e.g., the memory 1030) to cause the device 1005 to perform various functions (e.g., functions or tasks supporting gateway selection for private wireless networks).

The inter-station communications manager 1045 may manage communications with other base station 105, and may include a controller or scheduler for controlling communications with UEs 115 in cooperation with other base stations 105. For example, the inter-station communications manager 1045 may coordinate scheduling for transmissions to UEs 115 for various interference mitigation techniques such as beamforming or joint transmission. In some examples, the inter-station communications manager 1045 may provide an X2 interface within an LTE/LTE-A wireless communication network technology to provide communication between base stations 105.

Figure 11:
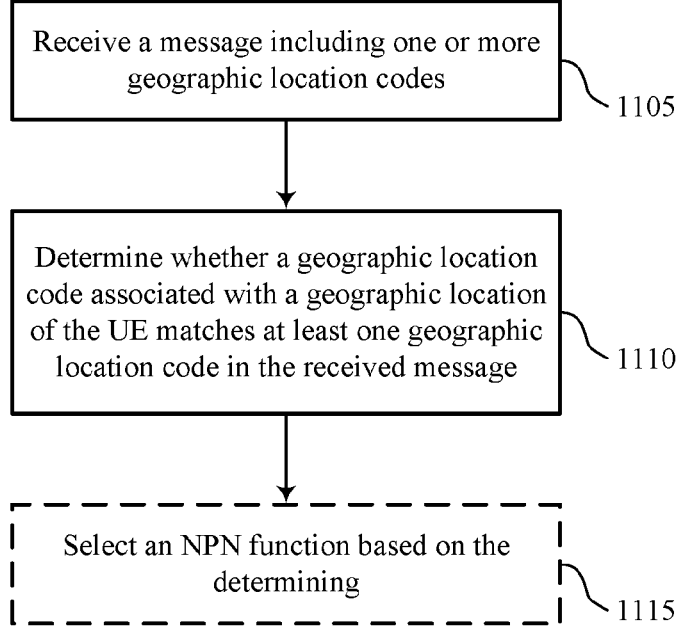

FIG. 11 shows a flowchart illustrating a method 1100 in accordance with one or more aspects of the present disclosure. The operations of method 1100 may be implemented by a UE 115 or its components as described herein. For example, the operations of method 1100 may be performed by a UE communications manager as described with reference to FIGS. 3 through 6. In some examples, a UE may execute a set of instructions to control the functional elements of the UE to perform the functions described below. Additionally or alternatively, a UE may perform aspects of the functions described below using special-purpose hardware.

At 1105, the UE may receive a message including one or more geographic location codes. The operations of 1105 may be performed according to the methods described herein. In some examples, aspects of the operations of 1105 may be performed by a message component as described with reference to FIGS. 3 through 6.

At 1110, the UE may determine whether a geographic location code associated with a geographic location of the UE matches at least one geographic location code in the received message. The operations of 1110 may be performed according to the methods described herein. In some examples, aspects of the operations of 1110 may be performed by a location component as described with reference to FIGS. 3 through 6.

At 1115, the UE may select an NPN function based on the determining. The operations of 1115 may be performed according to the methods described herein. In some examples, aspects of the operations of 1115 may be performed by a network component as described with reference to FIGS. 3 through 6.

FIG. 12 shows a flowchart illustrating a method 1200 in accordance with one or more aspects of the present disclosure. The operations of method 1200 may be implemented by a UE 115 or its components as described herein. For example, the operations of method 1200 may be performed by a UE communications manager as described with reference to FIGS. 3 through 6. In some examples, a UE may execute a set of instructions to control the functional elements of the UE to perform the functions described below. Additionally or alternatively, a UE may perform aspects of the functions described below using special-purpose hardware.

At 1205, the UE may determine that an NPN function selection for a geographic location of the UE is independent of an interception condition associated with the geographic location. The operations of 1205 may be performed according to the methods described herein. In some examples, aspects of the operations of 1205 may be performed by a network component as described with reference to FIGS. 3 through 6.

At 1210, the UE may discover a set of NPN functions based on the determining. The operations of 1210 may be performed according to the methods described herein. In some examples, aspects of the operations of 1210 may be performed by a discover component as described with reference to FIGS. 3 through 6.

At 1215, the UE may select at least one NPN function of the set of NPN functions for an NPN associated with the geographic location of the UE, where the geographic location of the UE is different from a default geographic location associated with the UE. The operations of 1215 may be performed according to the methods described herein. In some examples, aspects of the operations of 1215 may be performed by a discover component as described with reference to FIGS. 3 through 6.

FIG. 13 shows a flowchart illustrating a method 1300 in accordance with one or more aspects of the present disclosure. The operations of method 1300 may be implemented by a UE 115 or its components as described herein. For example, the operations of method 1300 may be performed by a UE communications manager as described with reference to FIGS. 3 through 6. In some examples, a UE may execute a set of instructions to control the functional elements of the UE to perform the functions described below. Additionally or alternatively, a UE may perform aspects of the functions described below using special-purpose hardware.

At 1305, the UE may provide a first indication of at least one of an SNPN function or a second indication of an NPN, or both, for a query operation. The operations of 1305 may be performed according to the methods described herein. In some examples, aspects of the operations of 1305 may be performed by a query component as described with reference to FIGS. 3 through 6.

At 1310, the UE may discover a set of NPN functions based on the query operation. The operations of 1310 may be performed according to the methods described herein. In some examples, aspects of the operations of 1310 may be performed by a discover component as described with reference to FIGS. 3 through 6.

At 1315, the UE may select at least one NPN function of the set of NPN functions based on determining that NPN function selection for a geographic location of the UE is independent of an interception condition associated with the geographic location. The operations of 1315 may be performed according to the methods described herein. In some examples, aspects of the operations of 1315 may be performed by a network component as described with reference to FIGS. 3 through 6.

Figure 14:
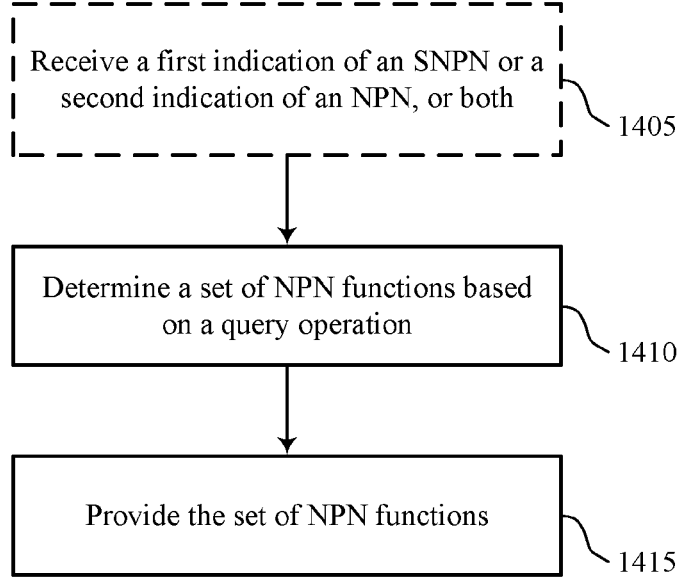

FIG. 14 shows a flowchart illustrating a method 1400 in accordance with one or more aspects of the present disclosure. The operations of method 1400 may be implemented by a base station 105 or its components as described herein. For example, the operations of method 1400 may be performed by a base station communications manager as described with reference to FIGS. 7 through 10. In some examples, a base station may execute a set of instructions to control the functional elements of the base station to perform the functions described below. Additionally or alternatively, a base station may perform aspects of the functions described below using special-purpose hardware.

At 1405, the base station may receive a first indication of an SNPN or a second indication of an NPN, or both. The operations of 1405 may be performed according to the methods described herein. In some examples, aspects of the operations of 1405 may be performed by a message component as described with reference to FIGS. 7 through 10.

At 1410, the base station may determine a set of NPN functions based on a query operation. The operations of 1410 may be performed according to the methods described herein. In some examples, aspects of the operations of 1410 may be performed by a network component as described with reference to FIGS. 7 through 10.

At 1415, the base station may provide the set of NPN functions. The operations of 1415 may be performed according to the methods described herein. In some examples, aspects of the operations of 1415 may be performed by a network component as described with reference to FIGS. 7 through 10.

It should be noted that the methods described herein describe possible implementations, and that the operations may be rearranged or otherwise modified and that other implementations are possible. Further, aspects from two or more of the methods may be combined.

The following provides an overview of examples of the present disclosure:

Example 1: A method of wireless communications at a UE is described. The method may include receiving a message including one or more geographic location codes, determining whether a geographic location code associated with a geographic location of the UE matches at least one geographic location code in the received message, and selecting a non-public network function based on the determining.

Example 2 The method of example 1, wherein the message includes non-public network function identifiers.

Example 3: The method of examples 1 or 2, further comprising: receiving the message may include operations, features, means, or instructions for receiving a list including a set of tuples including the geographic location codes or the non-public network function identifiers, or both.

Example 4: The method of any of examples 1 to 3, further comprising: determining that the geographic location code associated with the geographic location of the UE matches one or more geographic location codes associated with the geographic location codes in the received message, where selecting the non-public network function includes: selecting, based on a selection procedure, the non-public network function using a non-public network function identifier.

Example 5: The method of any of examples 1 to 4, further comprising: determining that a geographic location code of a serving public land mobile network matches at least one geographic location code associated with the geographic location codes in the received message.

Example 6: The method of any of examples 1 to 5, further comprising: terminating the selection procedure based on selecting the non-public network function using the non-public network function identifier.

Example 7: The method of any of examples 1 to 6, further comprising: refraining from determining whether selection of the non-public network function may be configured for the geographic location of the UE based on terminating the selection procedure.

Example 8: The method of any of examples 1 to 7, further comprising: determining that the geographic location code associated with the geographic location of the UE does not match at least one geographic location code associated with the geographic location codes in the received message, and performing a selection procedure to select the non-public network function based on determining that the geographic location code associated with the geographic location of the UE does not match at least one geographic location code associated with the geographic location codes in the received message.

Example 9: The method of any of examples 1 to 8, further comprising: determining whether selection of the non-public network function may be configured for the geographic location of the UE, and selecting the non-public network function using a default non-public network function identifier based on determining that selection of the non-public network function is not needed for the geographic location of the UE.

Example 10: The method of any of examples 1 to 9, further comprising: receiving the message may include operations, features, means, or instructions for receiving a default non-public network function identifier.

Example 11: The method of any of examples 1 to 10, wherein the geographic location codes corresponds to non-public network functions in a default geographic location associated with the UE.

Example 12: The method of any of examples 1 to 11, further comprising: selecting the non-public network function using a default non-public network function identifier and based on determining that the geographic location code associated with the geographic location of the UE does not match at least one geographic location code associated with the geographic location codes in the received message.

Example 13: The method of any of examples 1 to 12, wherein the geographic location codes include mobile country codes.

Example 14: The method of any of examples 1 to 13, wherein the non-public network function includes a non-public network non-third generation partnership project interworking function.

Example 15: The method of any of examples 1 to 14, wherein the non-public network function identifier includes a non-public network non-third generation partnership project interworking function identifier.

Example 16: The method of any of examples 1 to 15, wherein the non-public network non-third generation partnership project interworking function identifier may be a fully-qualified domain name.

Example 17: The method of any of examples 1 to 16, wherein the non-public network non-third generation partnership project interworking function identifier may be an internet protocol address.

Example 18: A method of wireless communications at a UE is described. The method may include determining that a non-public network function selection for a geographic location of the UE is independent of an interception condition associated with the geographic location, discovering a set of non-public network functions based on the determining, and selecting at least one non-public network function of the set of non-public network functions for a non-public network associated with the geographic location of the UE, where the geographic location of the UE is different from a default geographic location associated with the UE.

Example 19: The method of example 18, further comprising: receiving a message including an indication that the non-public network function selection for the geographic location of the UE may be independent of the interception condition associated with the geographic location, where selecting the at least one non-public network function of the set of non-public network functions for the non-public network associated with the geographic location of the UE may be based on the received message including the indication.

Example 20: The method of examples 18 or 19, further comprising: determining a domain name associated with the geographic location of the UE, where a query operation may be performed using the domain name associated with the geographic location of the UE, and discovering the set of non-public network functions may be based on the performed query operation.

Example 21: The method of examples 18 to 20, wherein the query operation includes a domain name system naming authority pointer query operation.

Example 22: The method of examples 18 or 21, further comprising: receiving a set of records related to the domain name associated with the geographic location of the UE based on the performed query operation, where selecting the at least one non-public network function of the set of non-public network functions for the non-public network associated with the geographic location of the UE may be based on at least one record of the set of records.

Example 23: The method of examples 18 to 22, wherein the set of records includes a set of network identifiers associated with a set of public land mobile networks.

Example 24: The method of examples 18 to 23, wherein the set of records includes an indication that the non-public network function selection for the geographic location of the UE may be independent of the interception condition associated with the geographic location.

Example 25: The method of examples 18 to 24, wherein the set of records includes a list of standalone non-public networks and selecting the at least one non-public network function of the set of non-public network functions for the non-public network associated with the geographic location of the UE may be based on the list of standalone non-public networks.

Example 26: The method of examples 18 to 25, wherein the set of records includes a set of naming authority pointer records.

Example 27: The method of examples 18 to 26, wherein the domain name includes a fully-qualified domain name.

Example 28: The method of examples 18 to 27, further comprising: receiving a message including a list of non-public networks that may be independent of the interception condition associated with the geographic location, where selecting the at least one non-public network function of the set of non-public network functions for the non-public network associated with the geographic location of the UE may be based on the list of non-public networks that may be independent of the interception condition.

Example 29: The method of examples 18 to 28, wherein the interception condition includes a local legal interception condition associated with the geographic location of the UE.

Example 30: A method of wireless communications at a UE is described. The method may include providing a first indication of at least one of a standalone non-public network function or a second indication of a non-public network, or both, for a query operation, discovering a set of non-public network functions based on the query operation, and selecting at least one non-public network function of the set of non-public network functions based on determining that non-public network function selection for a geographic location of the UE is independent of an interception condition associated with the geographic location.

Example 31: The method of example 30, wherein the query operation may be performed using a domain name of the geographic location of the UE, where the geographic location of the UE may be different from a default geographic location associated with the UE.

Example 32: The method of examples 30 or 31, further comprising: generating the domain name using a set of labels, where the domain name includes a fully-qualified domain name.

Example 33: The method of examples 30 to 32, wherein a first label of the set of labels includes a non-public network function identifier.

Example 34: The method of examples 30 to 33, wherein a first label of the set of labels includes a public land mobile network identifier and a network identifier associated with a standalone non-public network.

Example 35: The method of examples 30 to 34, wherein a second label of the set of labels includes a standalone non-public network identifier.

Example 36: The method of examples 30 to 35, wherein a third label of the set of labels includes a geographic location code identifying the geographic location in which the UE may be located.

Example 37: The method of examples 30 to 36, wherein the geographic location code includes a mobile country code.

Example 38: The method of examples 30 to 37, wherein a fourth label of the set of labels includes a geographic location code identifying a visited geographic location of the UE.

Example 39: The method of examples 30 to 38, wherein one or more naming authority pointer records associated with the domain name of the geographic location include a set of network identifiers associated with a set of public land mobile networks.

Example 40: The method of examples 30 to 39, further comprising: selecting a packet gateway based on the set of network identifiers associated with the set of public land mobile networks.

Example 41: The method of examples 30 to 40, further comprising: determining that the non-public network function selection for the geographic location of the UE may be independent of the interception condition associated with the geographic location may be based on a query result of the query operation.

Example 42: The method of examples 30 to 41, wherein the query result includes a set of records including a service instance associated with a fully-qualified domain name including a set of query labels.

Example 43: The method of examples 30 to 42, wherein the query operation includes a domain name system naming authority pointer query operation.

Example 44: The method of examples 30 to 43, wherein the interception condition includes a local legal interception condition associated with the geographic location of the UE.

Example 45: The method of examples 30 to 44, wherein the selecting is based at least in part on placing an emergency call.

Example 46: A method of wireless communications at a base station is described. The method may include receiving a first indication of a standalone non-public network or a second indication of a non-public network, or both, determining a set of non-public network functions based on a query operation, and providing the set of non-public network functions.

Example 47: The method of example 46, wherein the set of non-public network functions includes a non-public network non-third generation partnership project interworking functions.

Example 48: The method of example 46 or 47, wherein the query operation includes a domain name system naming authority pointer query operation.

Example 49: An apparatus for wireless communications comprising a processor; and memory coupled to the processor, the processor and memory configured to perform a method of any of examples 1-17.

Example 50: An apparatus for wireless communications comprising at least one means for performing a method of any of examples 1-17.

Example 51: A computer-readable medium storing code for wireless communications, the code comprising instructions executable by a processor to perform a method of any of examples 1-17.

Example 52: An apparatus for wireless communications comprising a processor; and memory coupled to the processor, the processor and memory configured to perform a method of any of examples 18-29.

Example 53: An apparatus for wireless communications comprising at least one means for performing a method of any of examples 18-29.

Example 54: A computer-readable medium storing code for wireless communications, the code comprising instructions executable by a processor to perform a method of any of examples 18-29.

Example 55: An apparatus for wireless communications comprising a processor; and memory coupled to the processor, the processor and memory configured to perform a method of any of examples 30-45.

Example 56: An apparatus for wireless communications comprising at least one means for performing a method of any of examples 30-45.

Example 57: A computer-readable medium storing code for wireless communications, the code comprising instructions executable by a processor to perform a method of any of examples 30-45.

Example 58: An apparatus for wireless communications comprising a processor; and memory coupled to the processor, the processor and memory configured to perform a method of any of examples 46-48.

Example 59: An apparatus for wireless communications comprising at least one means for performing a method of any of examples 46-48.

Example 60: A computer-readable medium storing code for wireless communications, the code comprising instructions executable by a processor to perform a method of any of examples 46-48.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example operation that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a user equipment (UE), comprising:

transmitting a first message for a query operation, the first message indicating a standalone non-public network and a geographic location of the UE;

receiving a second message in response to the first message for the query operation, wherein the second message is based at least in part on the standalone non-public network and the geographic location of the UE; and selecting, based at least in part on whether the second message indicates any non-public network functions, one of a first non-public network function corresponding to a first standalone non-public network function identifier configured at the UE or at least one second non-public network function from a set of one or more non-public network functions indicated by the second message.

2. The method of claim 1, wherein the query operation is performed using a domain name of the geographic location of the UE, wherein the geographic location of the UE is different from a default geographic location associated with the UE.

3. The method of claim 2, further comprising:

generating the domain name using a set of labels, wherein the domain name comprises a fully-qualified domain name.

4. The method of claim 3, wherein a first label of the set of labels comprises a non-public network function identifier.

5. The method of claim 3, wherein a first label of the set of labels comprises a public land mobile network identifier and a network identifier associated with the standalone non-public network.

6. The method of claim 3, wherein a second label of the set of labels comprises a standalone non-public network identifier.

7. The method of claim 3, wherein a third label of the set of labels comprises a geographic location code identifying the geographic location in which the UE is located.

8. The method of claim 7, wherein the geographic location code comprises a mobile country code.

9. The method of claim 3, wherein a fourth label of the set of labels comprises a geographic location code identifying a visited geographic location of the UE.

10. The method of claim 2, wherein one or more naming authority pointer records associated with the domain name of the geographic location include a set of network identifiers associated with a set of public land mobile networks.

11. The method of claim 10, further comprising:

selecting a packet gateway based at least in part on the set of network identifiers associated with the set of public land mobile networks.

12. The method of claim 1, wherein the non-public network function selection for the geographic location of the UE is independent of an interception condition associated with the geographic location is based at least in part on a query result of the query operation.

13. The method of claim 12, wherein the query result comprises a set of records including a service instance associated with a fully-qualified domain name comprising a set of query labels.

14. The method of claim 1, wherein the query operation comprises a domain name system naming authority pointer query operation.

15. The method of claim 1, wherein an interception condition comprises a local legal interception condition associated with the geographic location of the UE.

16. The method of claim 1, wherein the selecting is based at least in part on placing an emergency call.

17. A user equipment (UE) for wireless communications, comprising:
  one or more memories storing processor-executable code; and
  one or more processors coupled with the one or more memories and individually or collectively operable to execute the code to cause the UE to:
    transmit a first message for a query operation, the first message indicating a standalone non-public network and a geographic location of the UE;
    receive a second message in response to the first message for the query operation, wherein the second message is based at least in part on the standalone non-public network and the geographic location of the UE; and
    select, based at least in part on whether the second message indicates any non-public network functions, one of a first non-public network function corresponding to a first standalone non-public network function identifier configured at the UE or at least one second non-public network function from a set of one or more non-public network functions indicated by the second message.

18. The UE of claim 17, wherein the query operation is performed using a domain name of the geographic location of the UE, wherein the geographic location of the UE is different from a default geographic location associated with the UE.

19. The UE of claim 18, wherein the one or more processors are individually or collectively further operable to execute the code to cause the UE to:
  generate the domain name using a set of labels, wherein the domain name comprises a fully-qualified domain name.

20. The UE of claim 19, wherein a first label of the set of labels comprises a non-public network function identifier.

21. The UE of claim 19, wherein a first label of the set of labels comprises a public land mobile network identifier and a network identifier associated with the standalone non-public network.

22. The UE of claim 19, wherein a second label of the set of labels comprises a standalone non-public network identifier.

23. The UE of claim 19, wherein a third label of the set of labels comprises a geographic location code identifying the geographic location in which the UE is located.

24. The UE of claim 23, wherein the geographic location code comprises a mobile country code.

25. The UE of claim 19, wherein a fourth label of the set of labels comprises a geographic location code identifying a visited geographic location of the UE.

26. The UE of claim 18, wherein one or more naming authority pointer records associated with the domain name of the geographic location include a set of network identifiers associated with a set of public land mobile networks.

27. A non-transitory computer-readable medium storing code for wireless communications by a user equipment (UE), the code comprising instructions executable by one or more processors to:
  transmit a first message for a query operation, the first message indicating a standalone non-public network and a geographic location of the UE;
  receive a second message in response to the first message for the query operation, wherein the second message is based at least in part on the standalone non-public network and the geographic location of the UE; and
  select, based at least in part on whether the second message indicates any non-public network functions, one of a first non-public network function corresponding to a first standalone non-public network function identifier configured at the UE or at least one second non-public network function from a set of one or more non-public network functions indicated by the second message.

28. The non-transitory computer-readable medium of claim 27, wherein the query operation is performed using a domain name of the geographic location of the UE, wherein the geographic location of the UE is different from a default geographic location associated with the UE.

29. The non-transitory computer-readable medium of claim 28, wherein the instructions are further executable by the one or more processors to:
  generate the domain name using a set of labels, wherein the domain name comprises a fully-qualified domain name.

30. A user equipment (UE) for wireless communications, comprising:
  means for transmitting a first message for a query operation, the first message indicating a standalone non-public network and a geographic location of the UE;
  means for receiving a second message in response to the first message for the query operation, wherein the second message is based at least in part on the standalone non-public network and the geographic location of the UE; and
  means for selecting, based at least in part on whether the second message indicates any non-public network functions, one of a first non-public network function corresponding to a first standalone non-public network function identifier configured at the UE or at least one second non-public network function from a set of one or more non-public network functions indicated by the second message.

* * * * *